United States Patent
Maruyama

(10) Patent No.: US 10,853,072 B2
(45) Date of Patent: Dec. 1, 2020

(54) ARITHMETIC PROCESSING APPARATUS AND METHOD OF CONTROLLING ARITHMETIC PROCESSING APPARATUS

(71) Applicant: FUJITSU LIMITED, Kawasaki (JP)

(72) Inventor: Masaharu Maruyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/423,688

(22) Filed: May 28, 2019

(65) Prior Publication Data

US 2019/0377575 A1 Dec. 12, 2019

(30) Foreign Application Priority Data

Jun. 6, 2018 (JP) .................................. 2018-108951

(51) Int. Cl.
*G06F 9/30* (2018.01)
*G06F 12/1027* (2016.01)
*G06F 12/0897* (2016.01)

(52) U.S. Cl.
CPC ........ *G06F 9/30058* (2013.01); *G06F 9/3016* (2013.01); *G06F 12/0897* (2013.01); *G06F 12/1027* (2013.01)

(58) Field of Classification Search
CPC . G06F 12/1027; G06F 9/30058; G06F 9/3016
See application file for complete search history.

(56) References Cited

U.S. PATENT DOCUMENTS

| 5,717,946 A | 2/1998 | Satou et al. |
| 2007/0005895 A1 | 1/2007 | Fujisaki et al. |
| 2009/0300339 A1 | 12/2009 | Kado |

(Continued)

FOREIGN PATENT DOCUMENTS

| JP | 7-114469 | 5/1995 |
| JP | 2011-265651 | 9/2001 |

(Continued)

OTHER PUBLICATIONS

Jann Horn, "Reading privileged memory with a side-channel", Jan. 3, 2018, [online], [searched on May 9, 2018], Internet <https://googleprojectzero.blogspot.jp/2018/01/reading-privileged-memory-with-side.html?m=1> (51 pages).

(Continued)

*Primary Examiner* — Zachary K Huson
(74) *Attorney, Agent, or Firm* — Fujitsu Patent Center

(57) ABSTRACT

An arithmetic processing apparatus includes: an instruction controller; a first level cache and a second level cache. The instruction controller, for a memory access instruction to be speculatively executed that is executed while a branch destination of a branch instruction is undetermined, adds a valid speculation flag and an instruction identifier of the branch instruction to the memory access instruction and issues to the first level cache. The first level cache controller interrupts execution of the memory access instruction when a virtual address of the memory access instruction hits in a TLB of the first level cache, the speculation flag of the memory access instruction is valid and an entry having a virtual address matching the virtual address of the memory access instruction stores a speculative access prohibition flag prohibiting speculative access.

7 Claims, 18 Drawing Sheets

(56) References Cited

U.S. PATENT DOCUMENTS

| | | | | |
|---|---|---|---|---|
| 2011/0219208 A1* | 9/2011 | Asaad | ............... | G06F 12/0862 |
| | | | | 712/12 |
| 2014/0129798 A1* | 5/2014 | Deutschle | ........... | G06F 12/1009 |
| | | | | 711/207 |
| 2014/0208075 A1* | 7/2014 | McCormick, Jr. | ...... | G06F 9/383 |
| | | | | 712/207 |
| 2016/0196210 A1* | 7/2016 | Noguchi | ............. | G06F 12/0811 |
| | | | | 711/122 |
| 2017/0053124 A1 | 2/2017 | Oyama | | |
| 2019/0377575 A1 | 12/2019 | Maruyama | | |

FOREIGN PATENT DOCUMENTS

| | | |
|---|---|---|
| JP | 2007-11689 | 1/2007 |
| JP | 2007-052481 | 3/2007 |
| JP | 2012-128656 | 7/2012 |
| JP | 2017-041145 | 2/2017 |

OTHER PUBLICATIONS

USPTO—Huson—Non-Final Office Action for related U.S. Appl. No. 16/426,816 dated Jun. 25, 2020 [pending].
USPTO—Huson—Notice of Allowance for related U.S. Appl. No. 16/426,816 dated Sep. 1, 2020[allowed].

\* cited by examiner

ARITHMETIC PROCESSING APPARATUS AND METHOD OF CONTROLLING ARITHMETIC PROCESSING APPARATUS

CROSS-REFERENCE TO RELATED APPLICATION

This application is based upon and claims the benefit of priority of the prior Japanese Patent Application No. 2018-108951, filed on Jun. 6, 2018, the entire contents of which are incorporated herein by reference.

FIELD

The present embodiment relates to an arithmetic processing apparatus and a control method of the arithmetic processing apparatus.

BACKGROUND

An arithmetic processing apparatus is a processor or a central processing unit (CPU) chip. Hereinafter, an arithmetic processing apparatus is referred to as a processor. A processor has various features in terms of structure or control in order to execute instructions in a program efficiently. An example is structure or control for speculatively executing instructions at a predicted branch destination before a branch condition of a branch instruction is determined.

In a case of control in which subsequent instructions are not executed until a branch destination of a branch instruction is determined, as time required until the branch destination is determined is extended, a state in which nothing is executable lasts longer. Thus, when subsequent instructions of a branch instruction are speculatively executed, a case in which a branch destination has been determined and branch prediction is correct, leads to performance improvement. When the branch prediction is incorrect, execution of all the subsequent instructions of the branch instruction is canceled, instructions at a correct branch destination are executed, and thus the program normally operates. A reason why the speculative execution instructions are cancelable is that a completion process for the speculative execution instructions is not performed until the branch destination is determined, and an architecture register defined by an instruction set is not updated.

Speculative execution, cache memory control, and the like in a processor are described in Japanese Laid-open Patent Publication No. 2017-41145, Japanese Laid-open Patent Publication No. 2007-52481, and Jann Horn, "Reading privileged memory with a side-channel", [online], [searched on May 9, 2018], internet<https://googleprojectzero.blogspot.jp/2018/01/reading-privileged-memory-with-side.html?m=1>.

It is reported that the following malicious program introduces security vulnerability for a processor. For example, while a branch destination of a branch instruction is not determined, a malicious load instruction at an incorrect branch destination is speculatively executed to read a secret value in a privileged mode region in a memory, a load instruction with the secret value being an address is speculatively executed to update a first level data cache memory, and the secret value is obtained based on a difference in access latency of the updated data cache memory.

In order to suppress the above-described security vulnerability, it is sufficient that the execution of the speculative execution load instruction is interrupted, and the execution of the load instruction is resumed after waiting branch determination of the branch instruction (branch prediction success).

However, when speculative execution of a load instruction or a store instruction following a branch instruction is made to wait until a branch is determined without exception, advantage of processing efficiency improvement of a processor by speculatively executing a memory access instruction may not be utilized. A memory access instruction performs a process with long latency for accessing a main memory due to a cache miss in some cases, and thus the speculative execution is one of important control methods for processing efficiency improvement.

Accordingly, an object of a first aspect of the present embodiment is to provide an arithmetic processing apparatus and a control method of the arithmetic processing apparatus for suppressing speculative execution of a memory access instruction to data storing important data while maintaining processor efficiency by speculatively executing a memory access instruction.

SUMMARY

According to an aspect of the embodiments, an arithmetic processing apparatus includes: an instruction controller; a first level cache; and a second level cache. The instruction controller, for a memory access instruction to be speculatively executed that is executed while a branch destination of a branch instruction is undetermined, adds a valid speculation flag and an instruction identifier of the branch instruction to the memory access instruction and issues to the first level cache. A first level cache controller interrupts execution of the memory access instruction when a virtual address of the memory access instruction hits in a TLB of the first level cache, the speculation flag of the memory access instruction is valid and an entry having a virtual address matching the virtual address of the memory access instruction stores a speculative access prohibition flag prohibiting speculative access.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

[Example of Security Vulnerability of Processor]

Figure 1:
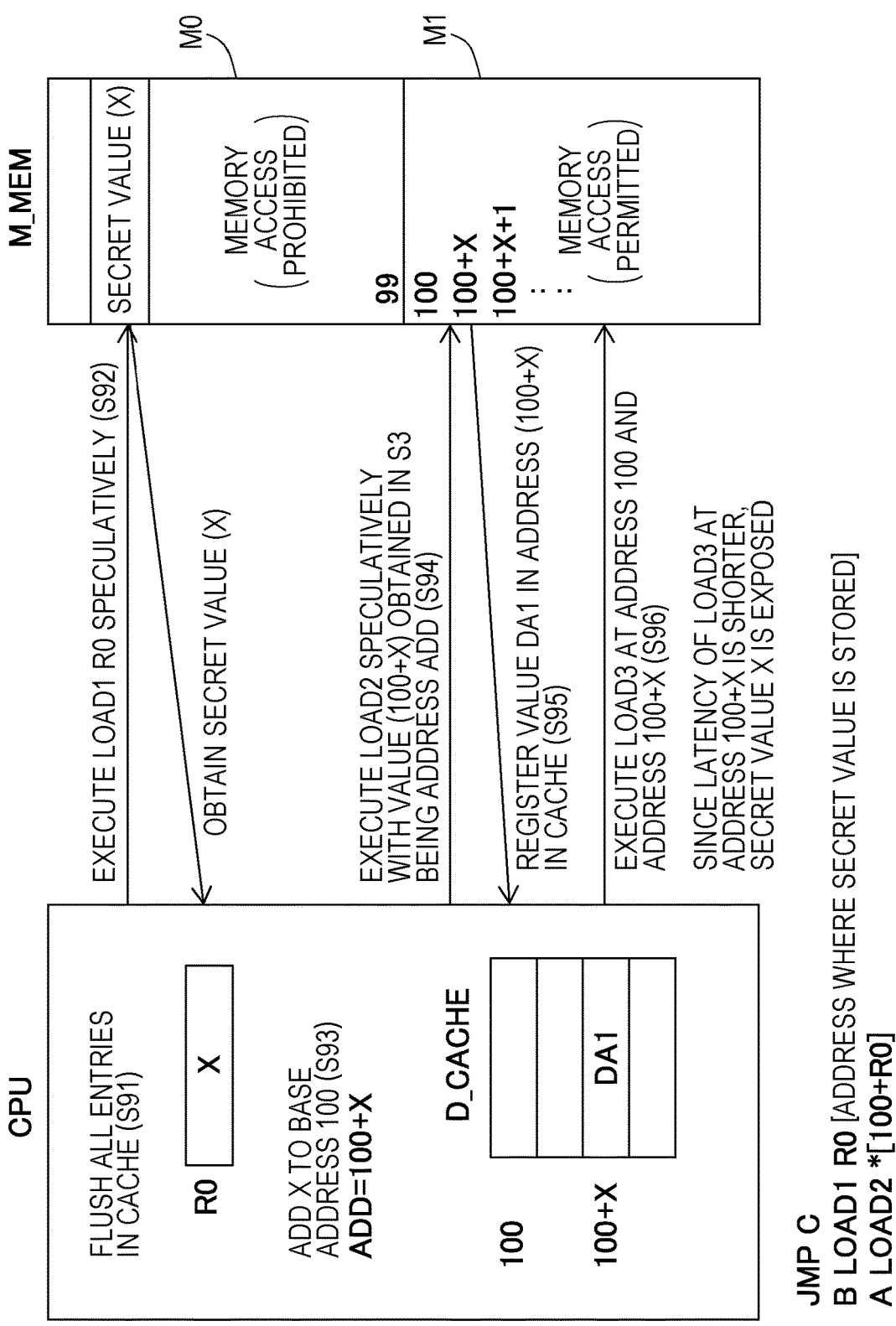
FIG. 1 is a diagram for explaining processor vulnerability.

FIG. 1 is a diagram for explaining processor vulnerability. The security vulnerability of the processor may appear, for example, when a malicious instruction sequence below is executed.

JMP C//a branch instruction to branch to a branch destination C//
B LOAD1 R0 [an address where a secret value is stored]// speculative loading at the address where the secret value is stored and storing the secret value in a register R0//
A LOAD2 *[100+R0]//speculative loading at an address (the secret value) in the register R0//

In the above instruction sequence, malicious load instructions "LOAD1" and "LOAD2" are added after the branch instruction JMP C. The malicious program, at first, clears contents of a cache memory, and transits to a privileged mode (OS mode) (S91). The processor executes the branch instruction JMP C in the privileged mode. Before the branch destination C of the branch instruction is determined, the load instruction LOAD1 at a predicted branch destination B is speculatively executed (S92). This predicted branch destination B is maliciously registered as branch prediction information, but a correct branch destination of the branch instruction is C.

When the processor speculatively executes this load instruction LOAD1 at the incorrect predicted branch destination B, a secret value X in a protected memory region M0 to which access is permitted only in the privileged mode is read, and stored in the register R0. This load instruction also registers the secret value X in a level-1 (L1) cache memory.

The secret value X is added to a leading address "100" of an access permitted region M1 (S93), and the next load instruction A LOAD2 is speculatively executed (S94). Then, a cache miss occurs in the L1 cache for the load instruction LOAD2 at an address 100+X obtained by adding the secret value X in the register R0 to the leading address [100], and a data request is issued to an L2 (Level-2) cache. According to this data request, data DA1 are read at the address 100+X in the access permitted region M1 being a memory to which access is permitted in a user mode. As a result, the data DA1 are registered in an entry at the address 100+X in the L1 cache memory of the processor, and the L1 cache is updated (S95).

Afterward, when the processor repeats an unillustrated load instruction LOAD3 with the address changed (S96), access latency of the load instruction at the address 100+X where the data DA1 are registered is shorter than that of the other address 100, and thus a content of the address 100+X may be known. This reduces security of the secret value X.

After the two load instructions LOAD1 and LOAD2 are speculatively executed, the execution of the branch instruction JMP C is completed and the branch destination is determined, it turns out that the predicted branch destination B is caused by a branch prediction mistake. As a result, the load instructions LOAD1 and LOAD2 speculatively executed in a pipeline circuit of the processor are invalidated, and a content of the register R0 is cleared. The instructions speculatively executed are not completed and the content of the register R0 being a renaming register is cleared. However, since the contents of the cache memory are not cleared, the secret value X based on the latency of the cache memory may be obtained.

In this way, one of causes of the processor vulnerabilities is that, before the branch destination of the branch instruction JMP is determined, the load instructions LOAD1 and LOAD2 to be speculatively executed at the incorrect predicted branch destination are executed, and a cache registration state is maintained by executing LOAD2.

[Branch Instruction and Memory Access Instructions to be Speculatively Executed]

Figure 2:
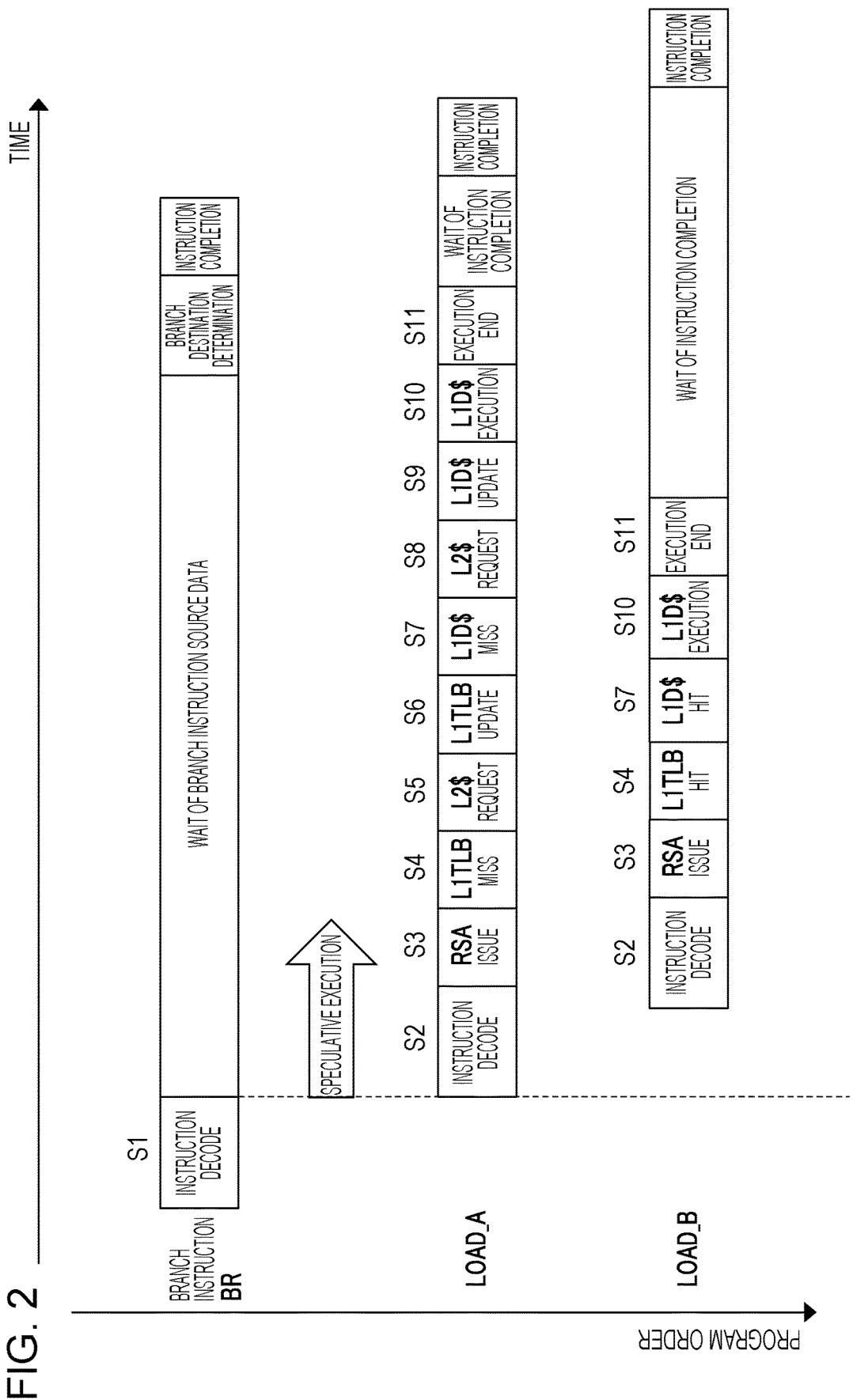
FIG. 2 is a diagram illustrating an operation example of a branch instruction and subsequent memory access instructions to be speculatively executed.

FIG. 2 is a diagram illustrating an operation example of a branch instruction and subsequent memory access instructions to be speculatively executed. A horizontal axis indicates time and a vertical axis indicates a program order in FIG. 2. In FIG. 2, a branch instruction BR and a subsequent load instruction LOAD_A and a load instruction LOAD_B are issued in order.

Figure 3:
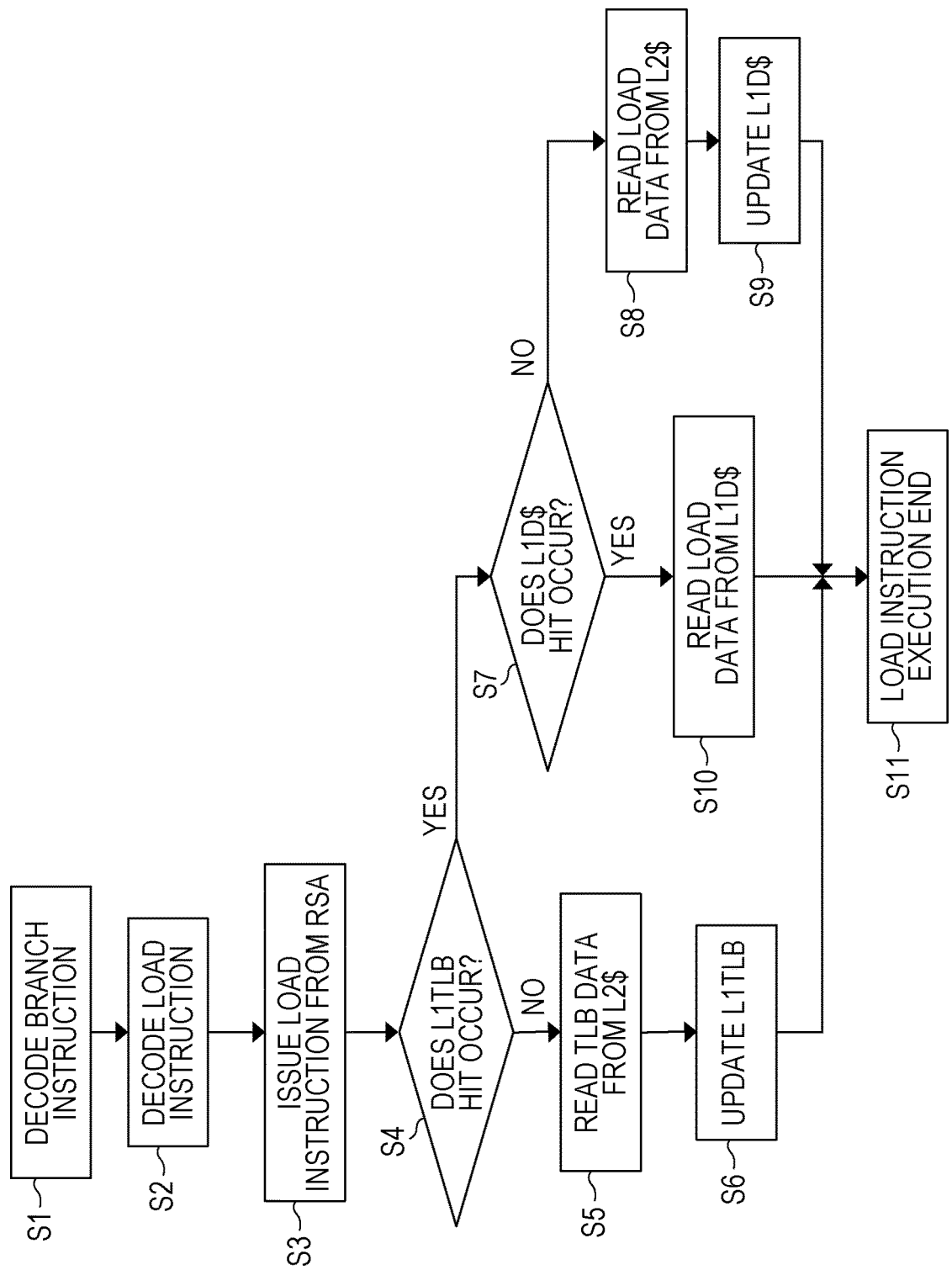
FIG. 3 is a flowchart diagram of processing for the branch instruction and load instructions in FIG. 2.

FIG. 3 is a flowchart diagram of processing for the branch instruction and the load instructions in FIG. 2. With reference to FIG. 3, the processing for the branch instruction and the load instructions in FIG. 2 will be explained.

The branch instruction BR is decoded by an instruction decoder, and converted to an executable branch instruction and executed (S1). A branch destination of the branch instruction BR is determined, after source data of the branch instruction is received from an arithmetic unit or the like, and the instruction is completed. Instructions to be decoded and issued while a branch is not determined, that is, for example, during period from decoding of the branch instruction to determination of a branch destination, are instructions to be speculatively executed. Since both the load instructions LOAD_A and LOAD_B in FIG. 2 are issued while the branch is not determined, the load instructions are the memory access instructions to be speculatively executed.

Both the precedent load instruction LOAD_A and the subsequent load instruction LOAD_B are decoded (S2), issued from a reservation station for address generation (RSA) being a reservation station of a storage unit for processing a memory access instruction to a first level (hereinafter referred to as a level 1 (L1)) data cache, and queued in a queue in the L1 data cache (S3). The load instruction LOAD_A put (inputted) in an L1 data cache control unit (also called as a controller) from the queue in the L1 data cache is an instruction for which a cache miss occurs in the L1TLB, and a cache miss occurs also in an L1 data cache L1D$, and on the other hand, the load instruction LOAD_B is an instruction for which a cache hit occurs in the L1TLB, and a cache hit occurs also in the L1 data cache. A translation lookaside buffer (TLB) is an address translation table buffer for storing part of translation table entries (TTE) placed in a memory.

In this case, the precedent load instruction LOAD_A is, after decoded (S2), issued from the RSA (S3), a TLB cache miss occurs in the L1 data cache for the load instruction LOAD_A put in (inputted) from the queue in the L1 data cache (S4: NO), and a data request is issued to a second level (hereinafter referred to as an L2) cache L2$ (S5). The L2 cache executes the data request, reads TLB data from the main memory, and responds to the L1 data cache (S5), the L1TLB is updated with the data returned as the response (S6), and the execution of the load instruction is ended.

The load instruction LOAD_A is put in the L1 data cache again, a cache hit occurs in the L1TLB this time (S4: YES), a cache miss occurs in an L1 data cache memory (S7: NO), and a data request is issued to the L2 cache (S8). The L2 cache executes the data request, reads load data from the main memory, and responds to the L1 data cache (S8), L1 data cache memory is updated with the data returned as the response (S9), and the execution of the load instruction is ended.

The load instruction LOAD_A is put in the L1 data cache again, a cache hit occurs in the L1TLB (S4: YES), a cache hit occurs in the L1 data cache (S7: YES), load data are read from the L1 data cache memory (S10), and the execution of the load instruction ends (S11). After execution of an instruction of the previous branch instruction BR is completed, a completion process for the load instruction LOAD_A is performed. An instruction completion process is control for completing instructions in order, and for example, is accompanied by a process for storing load data in an architecture register.

On the other hand, the subsequent load instruction LOAD_B is issued from the RSA (S3), is put in from the queue in the L1 data cache, causes a cache hit in the L1TLB (S4: YES), further causes a cache hit in the L1 data cache memory (S7: YES), reads load data (S10), and ends the execution of the instruction (S11). After the instruction completion process is performed for the previous load instruction LOAD_A, a completion process for the load instruction LOAD_B is performed.

Each of the load instructions LOAD_A and LOAD_B illustrated in FIG. 2 indicates a case in which branch prediction for the branch instruction BR is correct (branch prediction success). When the branch prediction for the branch instruction is incorrect (branch prediction failure), the speculatively executed two load instructions LOAD_A and LOAD_B are invalidated and canceled, and the completion processes are not performed. The invalidation of the load instruction due to the branch prediction failure, invalidates the speculatively executed load instruction issued from the instruction decoder in the RSA or in the cache control unit, and also invalidates the load data stored in the renaming register.

[Overview of Present Embodiment]

Figure 4:
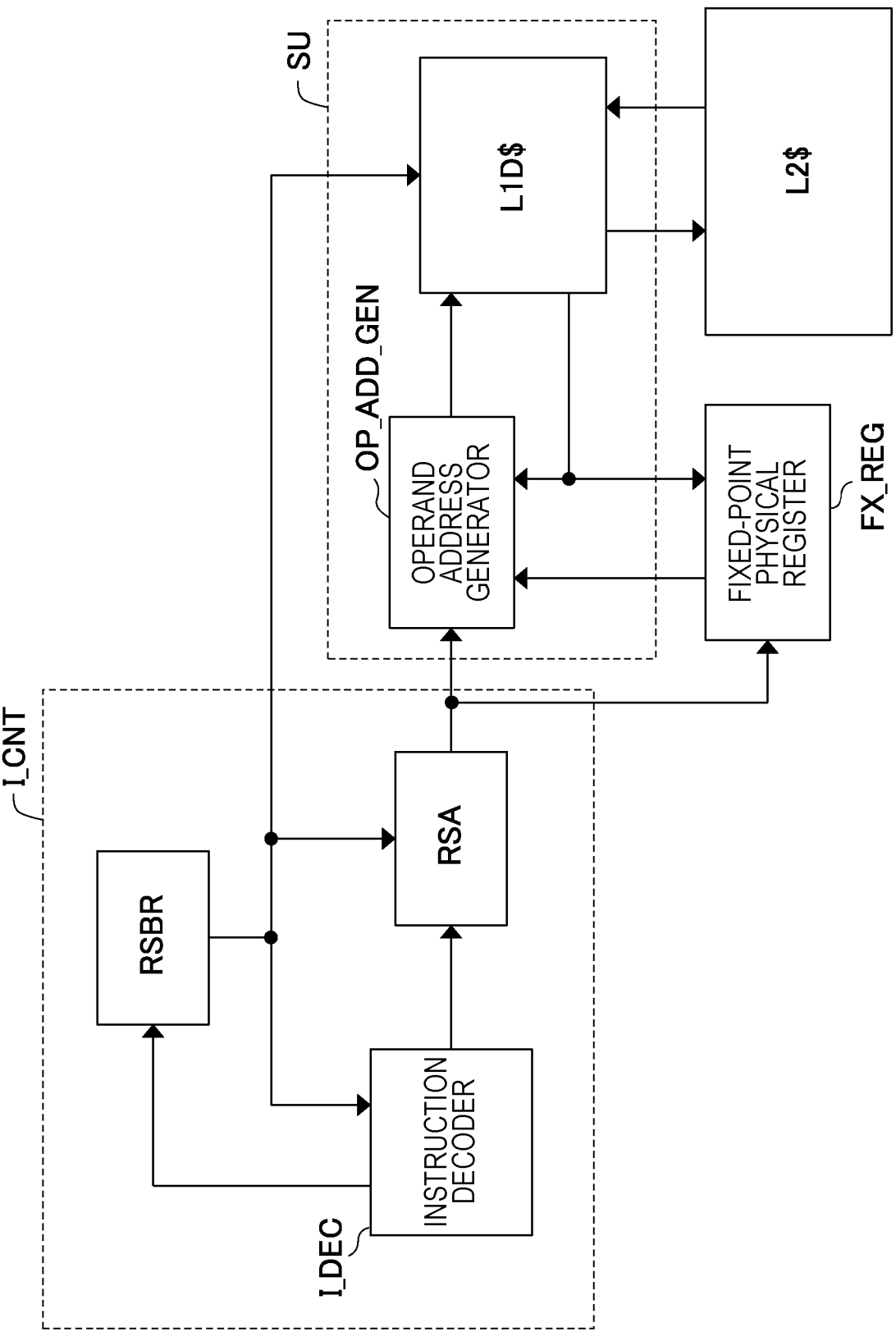
FIG. 4 is a diagram illustrating a schematic configuration of an arithmetic processing apparatus in the present embodiment.

FIG. 4 is a diagram illustrating a schematic configuration of an arithmetic processing unit in the present embodiment.

The arithmetic processing unit illustrated in FIG. 4 includes an instruction decoder I_DEC configuring an instruction control unit I_CNT, the RSA in which a memory access instruction issued by the instruction decoder is queued, and a reservation station for branch (RSBR) in which a branch instruction issued by the instruction decoder is queued.

The arithmetic processing unit further includes an oper- and address generator OP_ADD_GEN configuring a storage unit SU, and the L1 data cache L1D$. The L1 data cache L1D$ is connected with the L2 cache L2$. In a fixed-point physical register file FX_REG, an address generated by the operand address generator, data responded from the L1 data cache L1D$, and the like are stored. Fixed-point physical registers include a renaming register in which a process result is stored before a completion process for an instruction, and an architecture register in which a process result is stored in a completion process for an instruction.

Figure 5:
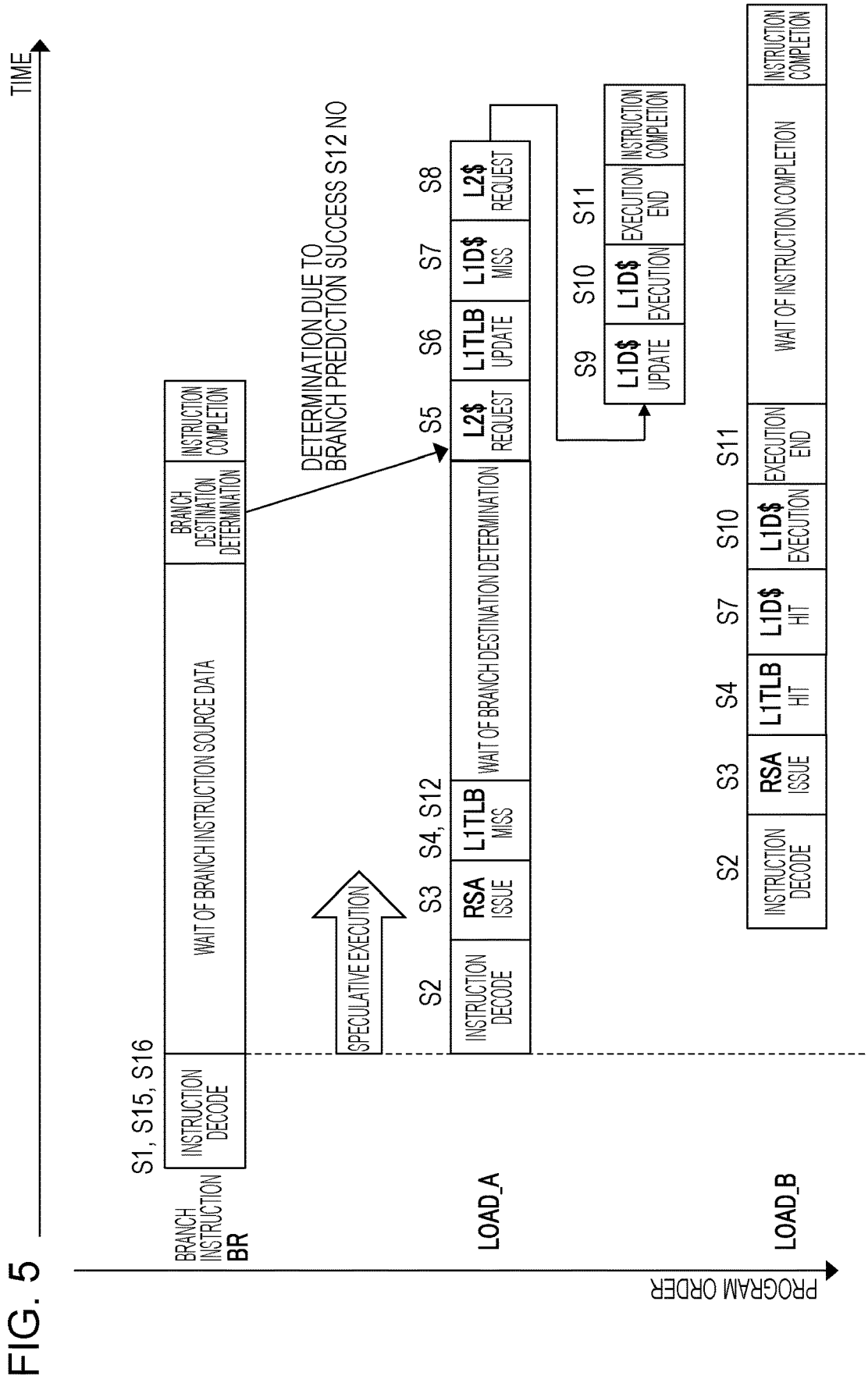
FIG. 5 is a diagram illustrating an operation example of the branch instruction and the subsequent memory access instructions to be speculatively executed in the present embodiment.
Figure 6:
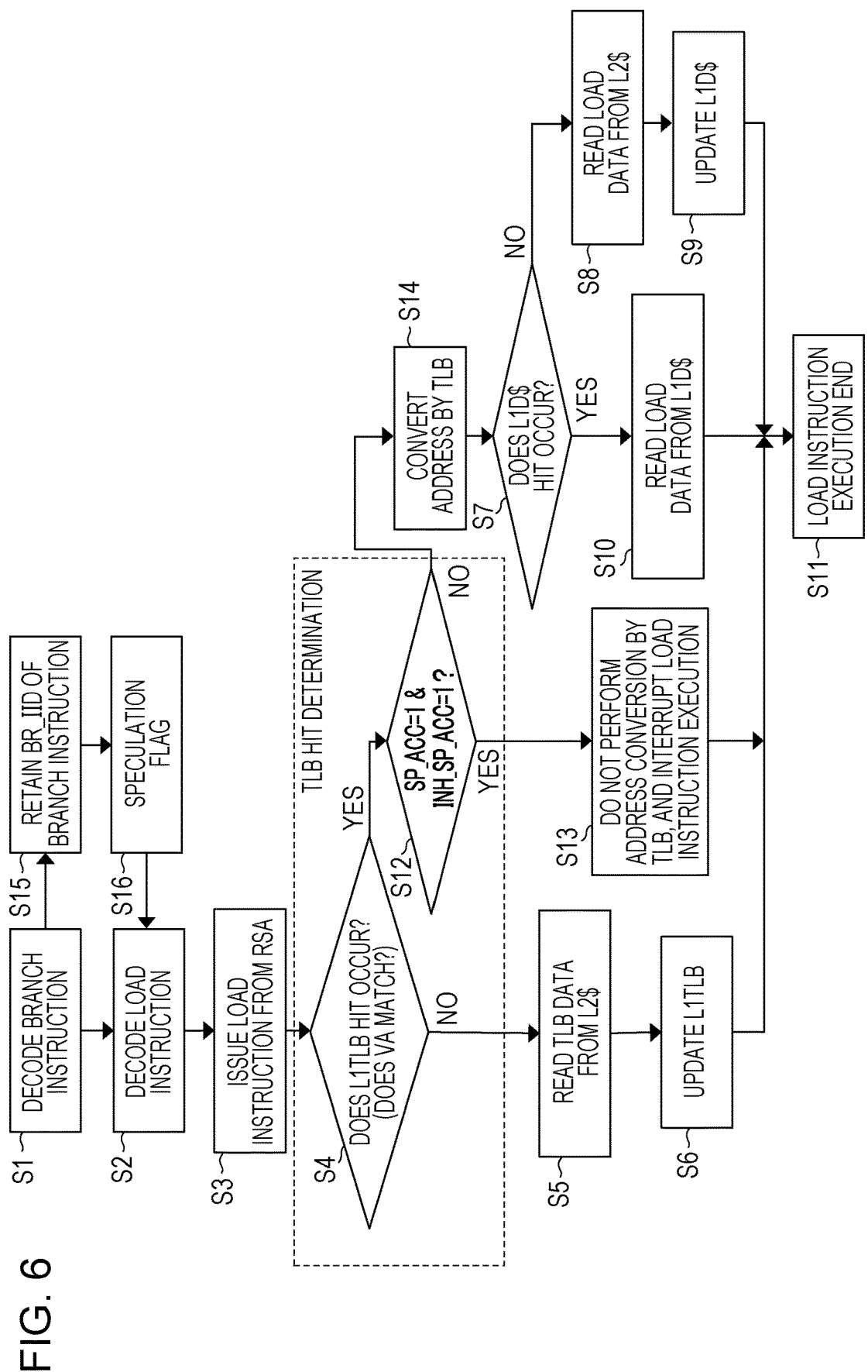
FIG. 6 is a flowchart diagram of processing for the branch instruction and the load instructions in the present embodiment.

FIG. 5 is a diagram illustrating an operation example of the branch instruction and the subsequent memory access instructions to be speculatively executed in the present embodiment. FIG. 6 is a flowchart diagram of processing for the branch instruction and the load instructions in the present embodiment. With reference to FIG. 4 and FIG. 6, processing for the branch instruction and the load instructions in FIG. 5 will be described.

First, the instruction decoder I_DEC, when decoding a branch instruction (S1), retains an instruction identifier (bridge instruction ID (BR_IID)) assigned to the branch instruction (S15), and retains a speculation flag that is validated while a branch of the branch instruction is not determined (S16). The instruction decoder, when decoding a load instruction being a memory access instruction, adds the BR_IID of a previous branch instruction, and the speculation flag to a memory access instruction (load instruction) that is speculatively executed and that is executed while a branch of a branch instruction is not determined. The instruction decoder issues the memory access instruction to the RSA, and queues the memory access instruction in an instruction issue queue of the RSA.

When the memory access instruction becomes executable, for example, when an operand address of the memory access instruction is prepared, the RSA issues the memory access instruction in the issue queue to the storage unit SU (S3). The issued memory access instruction is, after an operand address is generated in the operand address generator OP_ADD_GEN, sent to the L1 data cache L1D$.

The L1 data cache includes a memory access queue in which the memory access instruction is queued. The memory access instruction is added with the BR_IID of the branch instruction and the speculation flag, sent to the L1 data cache, and stored in the memory access queue.

Afterwards, for the memory access instruction put in from the memory access queue, TLB hit determination is performed in the L1TLB in the L1 data cache (S4, S12). In the TLB hit determination, all entries in the TLB are searched using a virtual address of an access destination address of the memory access instruction, and presence/absence of an entry having a conversion table for the same virtual address is checked (S4). A case in which any of the entries in the TLB has a virtual address matching the virtual address of the memory access instruction causes a TLB hit (S4: YES), and the TLB outputs a physical address corresponding to the virtual address. The TLB is a content addressable memory (or a content associative memory) that is searched using a virtual address, and that outputs a physical address associated with a virtual address matching the virtual address used for the search.

In the present embodiment, in an entry of a specific virtual address for information that requires high security such as a secret value in a translation table entry (TTE), a speculative access prohibition flag INH_SP_ACC is stored. The translation table entry (TTE) is stored in the main memory, and for part of the table, cache registration is performed in the L1TLB. Setting the speculative access prohibition flag to this translation table entry (TTE) is, for example, performed by an operating system (OS) based on directions from a user program. Thus, also in the L1TLB, the speculative access prohibition flag INH_SP_ACC is validated in an entry of a specific virtual address.

In the TLB hit determination, when a virtual address of any of the entries in the TLB matches the virtual address of the memory access instruction (S4: YES), whether both the speculation flag SP_ACC of the memory access instruction, and the speculative access prohibition flag INH_SP_ACC of the entry whose virtual address matches that of the memory access instruction are valid "1" or not is determined (S12).

When both of the flags are valid (S12: YES), a TLB miss due to speculative access prohibition for the specific address is determined to occur, processing of the memory access instruction is interrupted (aborted) (S13), execution of the load instruction is ended (S11), and the memory access instruction is sent back to the memory access queue.

On the other hand, when one of the speculation flag SP_ACC of the memory access instruction and the speculative access prohibition flag INH_SP_ACC of the entry whose virtual address matches that of the memory access instruction is invalid "0" (S12: NO), a TLB hit is determined to occur, a physical address of the entry whose virtual address matches that of the memory access instruction in the TLB is read, and address translation is performed (S14).

When, in the TLB hit determination, all the entries in the TLB do not match the virtual address of the memory access instruction (S4: NO), the L1 data cache control unit requests TLB data to the L2 cache (S5), and updates the L1TLB with the TLB data received from the L2 cache (S6). When the virtual addresses of all the entries in the TLB do not match the virtual address of the memory access instruction, since the TLB is required to be updated with a TLB entry whose virtual address matches that of the memory access instruction, and whether a speculative access prohibition flag thereof is valid or not is required to be determined, data are requested to the L2 cache, and the L1TLB is updated.

Next, when the TLB hit is determined to occur (S12: NO), and the virtual address is converted to a physical address by the TLB (S14), cache hit determination is performed for the L1 data cache memory in the L1 data cache (S7). When a cache miss occurs (S7: NO), the L1 data cache control unit issues a data request to the L2 cache to obtain load data from the L2 cache (S8), and updates the L1 data cache memory (S9). In this case, when the memory access instruction is put in again, a cache hit occurs (S7: YES).

On the other hand, when the cache hit occurs (S7: YES), load data are read from the L1 data cache memory (S10), the load data are stored in the renaming register being the fixed-point register, and the execution of the load instruction is ended.

Since the load instruction LOAD_A illustrated in FIG. 5 is a load instruction to be speculatively executed, the load instruction LOAD_A is added with the speculation flag SP_ACC and the BR_IID of the branch instruction from the instruction decoder, issued to the RSA, and further issued from the RSA to the L1 data cache. In the example in FIG. 5, since the load instruction LOAD_A to be speculatively executed is the load instruction for the specific address to which the speculative access is prohibited, in the TLB determination S12, SP_ACC=1 and INH_SP_ACC=1 are determined as YES, and the processing of the load instruction LOAD_A is interrupted.

The load instruction LOAD_A is brought into a state of waiting for a branch destination to be determined, and in a case where the branch destination has been determined as branch prediction success, the speculation flag SP_ACC of the load instruction is invalidated (SP_ACC=0). As a result, the TLB determination S12 results in NO, and the TLB hit occurs. Thus, the cache miss occurs in the L1 data cache memory for the load instruction LOAD_A (S7: NO), the data request is issued to the L2 cache to read the load data once (S8), and the L1 data cache memory is updated (S9). When the load instruction is put in again, the TLB hit occurs (S4: YES, S12: NO), an L1 data cache hit occurs (YES: S7), the data are read from the L1 data cache memory (S10), and the execution of the load instruction is ended (S11).

In the example in FIG. 5, since the branch has been determined for the branch instruction, and the branch prediction is correct, the L1 data cache obtains the data from the L2 cache for the two load instructions LOAD_A and LOAD_B, and updates the L1 data cache or the L1TLB cache. When the branch prediction is incorrect, the load instruction LOAD_A does not request data to the L2 cache and is invalidated, and although the execution of the load instruction LOAD_B is ended, a completion process for the load instruction LOAD_B is not performed and the load instruction LOAD_B is also invalidated.

As described above, in the present embodiment, not all the memory access instructions speculatively executed are interrupted in the L1 data cache. In the case in which the memory access instruction to be speculatively executed, even when the entry whose virtual address matches that of the memory access instruction exists in the L1TLB, accesses the virtual address to which the speculative access is prohibited (INH_SP_ACC=1), the TLB miss is determined to occur due to the speculative access prohibition for the specific address, the address translation by the TLB is not performed, and the execution of the memory access instruction is interrupted. Until the branch of the branch instruction is determined as the branch prediction success, the execution of the speculative execution memory access instruction has been interrupted. Even for the memory access instruction to be speculatively executed, in the case of accessing the address other than the virtual address to which the speculative access is prohibited (INH_SP_ACC=0), the execution of the instruction is performed. This suppresses reducing processing efficiency of the processor due to speculative access restriction.

[Processor and Information Processing Unit Including the Same According to Present Embodiment]

Figure 7:
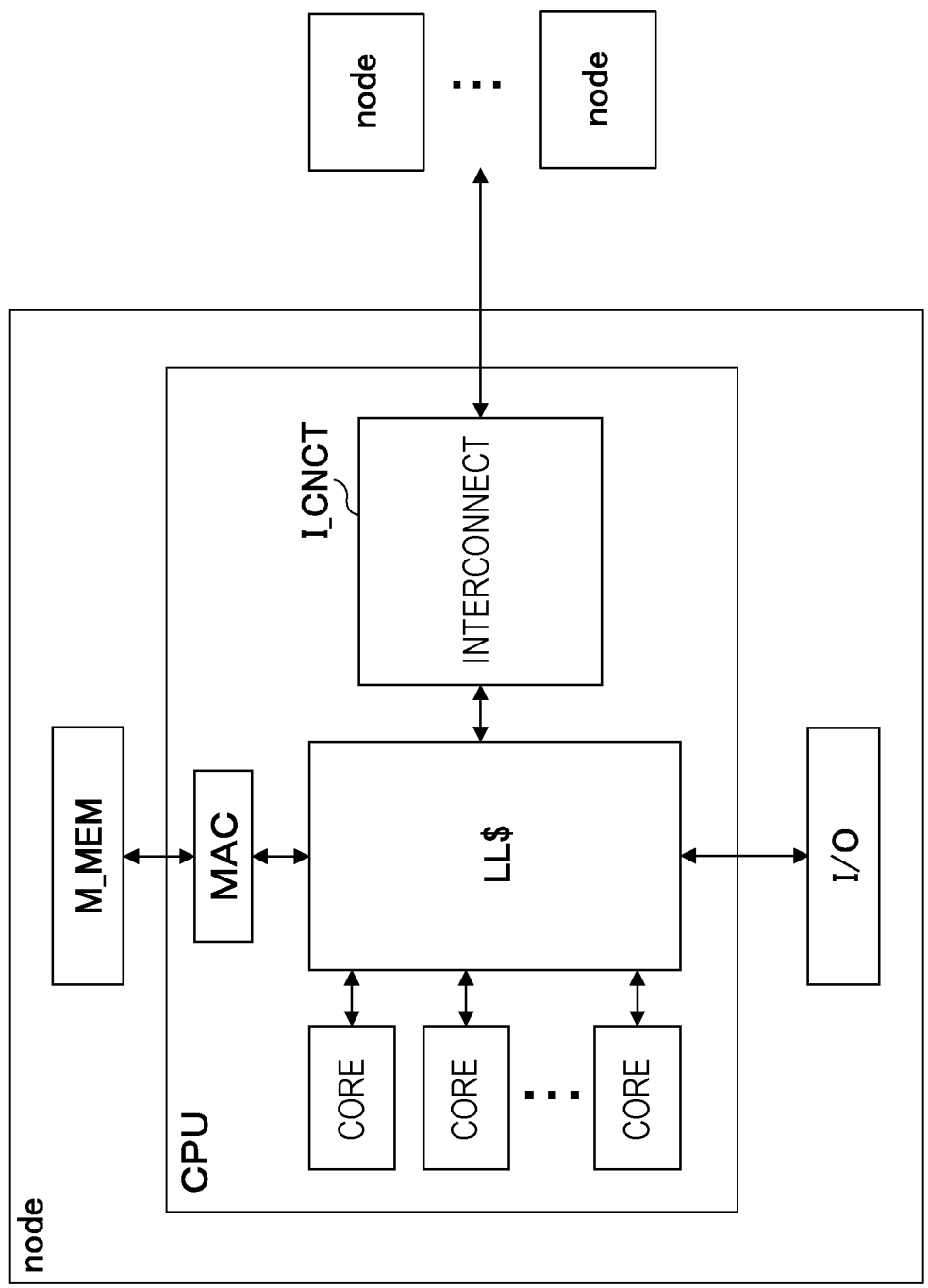
FIG. 7 is a schematic diagram of an information processing apparatus mounted with a processor in the present embodiment.

FIG. 7 is a schematic diagram of an information processing unit mounted with the processor in the present embodiment. An information processing unit, a high performance computer (HPC), or a super computer includes a processor central processing unit (CPU), a main memory M_MEM, and an input/output unit I/O in each of a plurality of nodes. The processor CPUs in the respective nodes mutually perform packet communication via interconnects provided in the respective processors.

The processor CPU being an arithmetic processing unit, includes a plurality of cores Core_0 to Core_n, a last level cache LL$ shared among the plurality of cores, a memory access control unit MAC configured to control access to a memory, and an interconnect I_CNCT configured to control the packet communication with the processors of other nodes. Each core CORE, as described later, includes an instruction control unit, an arithmetic unit, and an L1 cache. The last level cache LL$ in FIG. 7 is, for example, a second level cache or an L2 cache.

Figure 8:
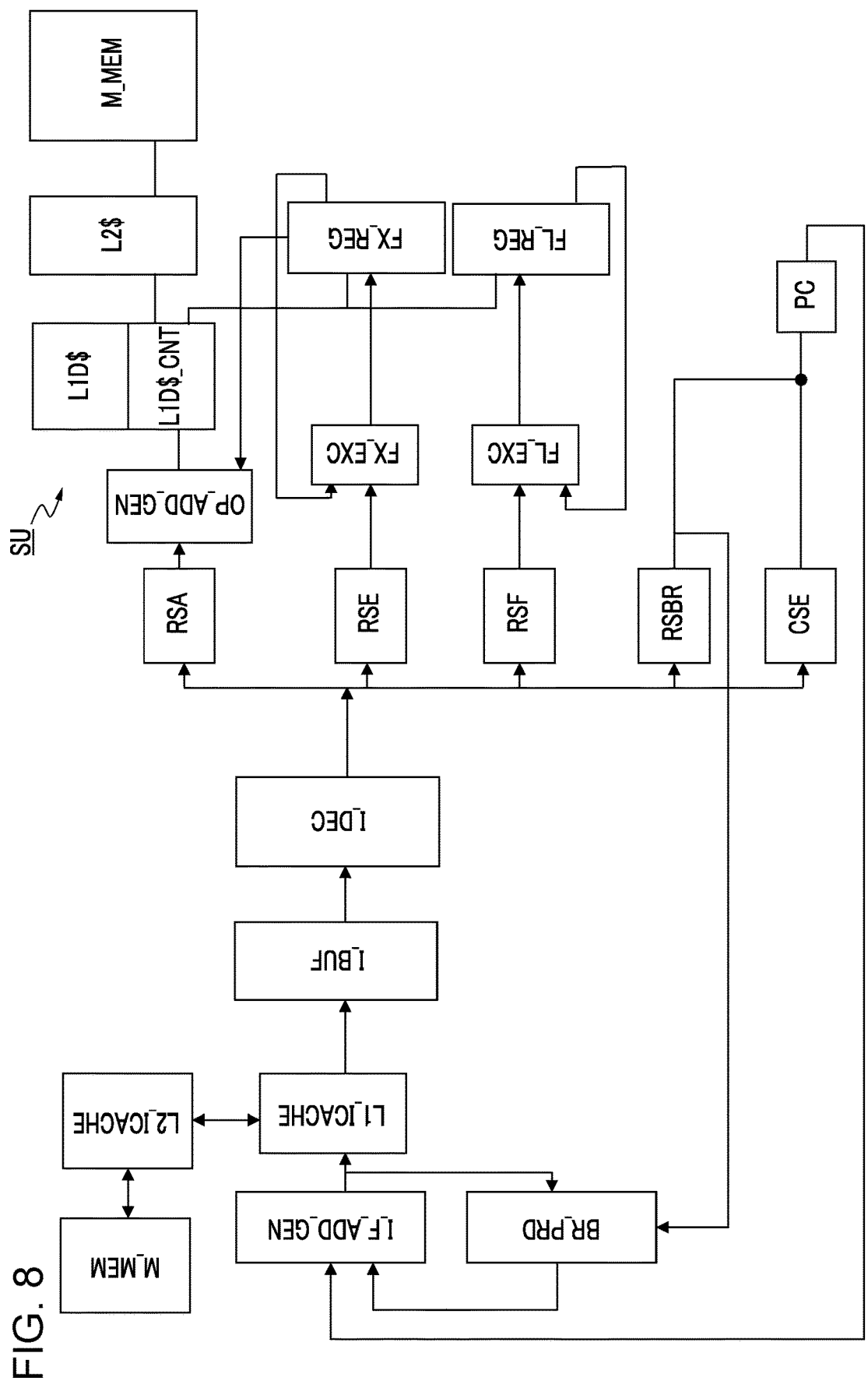
FIG. 8 is a diagram illustrating a configuration example of the processor in the present embodiment.

FIG. 8 is a diagram illustrating a configuration example of the processor in the present embodiment. The processor in FIG. 8, as an instruction control unit, includes an instruction fetch address generator I_F_ADD_GEN, an L1 instruction cache L1_ICACHE, an L2 instruction cache L2_ICACHE, an instruction buffer I_BUF, an instruction decoder I_DEC, and reservation stations RSA, RSE, and RSF being instruction issue units configured to issue a plurality of instructions to the arithmetic unit. The instruction control unit includes a reservation station for branch instruction RSBR, and a commit stack entry CSE.

The processor further includes, as a plurality of arithmetic units, the storage unit SU, a fixed-point arithmetic unit FX_EXC, and a floating-point arithmetic unit FL_EXC. One or a plurality of each type of these arithmetic units are included.

The storage unit SU includes the operand address generator OP_ADD_GEN including an addition/subtraction circuit for address calculation, and an L1 data cache L1_DCACHE. The L1 data cache includes, in addition to a cache memory, an L1 cache control unit L1$_CNT configured to control the cache memory.

Each of the fixed-point arithmetic unit FX_EXC and the floating-point arithmetic unit FL_EXC includes, for example, an addition/subtraction circuit, a logical operation unit, a multiplication unit, and the like. The floating-point arithmetic unit, for example, in order to be able to perform single instruction multiple data (SIMD) arithmetic, includes arithmetic units, the number of which corresponds to an SIMD width. The processor includes the fixed-point physical register file FX_REG for storing processing results by these arithmetic units, and a register file for floating-point FL_REG. These register files include a plurality of registers, and some of the registers include a renaming register in which a processing result is stored before a completion process for an instruction, and an architecture register in which a processing result is stored during a completion process for an instruction. The architecture register is a register accessible from software, and is a general register.

The processor further includes the L2 cache L2$ shared among the plurality of cores, and is connected with the main memory M_MEM via an unillustrated memory controller. The L2 instruction cache L2_ICACHE is also connected with the main memory M_MEM via a memory controller. The L2 cache L2$ is the above-described last level cache.

An overview of a configuration of the entire processor will be described below along a flow of instruction processing. The instruction fetch address generator I_F_ADD_GEN generates fetch addresses, and in order of execution in a program (in-order), fetch instructions are once stored from the L1 instruction cache L1_ICACHE in the instruction buffer I_BUF. The instruction decoder I_DEC is inputted with the fetch instructions in the instruction buffer in order and decodes the fetch instructions, and generates executable instructions (execution instructions) with information required for execution added.

Next, the execution instructions generated in the instruction decoder are queued in order in a storage called as a reservation station having a queue structure, and accumulated. The reservation station is an execution queue for accumulating execution instructions in a queue, and is provided for each arithmetic unit for executing instructions.

The reservation station includes, for example, the reservation station for address generation (RSA) provided to the storage unit SU including the L1 data cache L1$, the reservation station for execution (RSE) provided to the fixed-point arithmetic unit FX_EXC, and the reservation station for floating point (RSF) provided to the floating-point arithmetic unit FX_EXC. The reservation station for branch (RSBR) corresponding to a branch prediction unit BR_PRD is further included.

Hereinafter, the reservation station is appropriately abbreviated and referred to as the RS.

The execution instructions queued in the respective RSs, from the execution instructions for which execution conditions are met such as whether an input operand required for instruction execution is readable from a general register file due to a completion process for an arithmetic process of a previous instruction or not (whether a read after write (RAW) constraint is met or not), or whether a circuit resource for an arithmetic unit is usable or not, are issued to and executed by the arithmetic unit in random order (out-of-order).

On the other hand, the instruction decoder I_DEC assigns an instruction identifier (instruction identification (IID)) in order of execution in the program to the execution instruction generated by decoding the fetch instruction, and sends the execution instructions to the commit stack entry CSE (hereinafter referred to as the CSE) in order. The CSE includes a storage having a queue structure for storing the sent execution instructions in order, and an instruction commit processing unit configured to perform a commit process (completion process) for each instruction in response to a process completion report for the instruction from a pipeline circuit of an arithmetic unit, based on information in a queue and the like. Thus, the CSE is a completion process circuit (completion process unit) configured to perform a completion process for an instruction.

The execution instructions are stored in the queue in the CSE in order, and wait for the process completion reports for the execution instructions from the respective arithmetic units. As described above, the execution instructions are sent from the respective RSs to the arithmetic units in the out-of-order manner, and are executed by the arithmetic units. Afterward, when the process completion reports for the execution instructions are sent to the CSE, the instruction commit processing unit of the CSE performs completion processes for the execution instructions corresponding to the process completion reports in order, among the execution instructions stored in the queue and waiting for the process completion reports, and updates circuit resources such as registers. The CSE increments a program counter PC in the completion process.

Branch prediction is performed for a branch instruction queued in the RSBR for a branch process by the branch prediction unit BR_PRD, and the instruction fetch address generator I_F_ADD_GEN generates a branch destination address based on a prediction result. As a result, an instruction based on the branch prediction is read from an instruction cache, goes through an instruction buffer and an instruction decoder, and is speculatively executed by an arithmetic unit. The RSBR executes branch instructions in order. Before a branch destination of the branch instruction is determined, a branch destination is predicted, and instructions at the predicted branch destination are speculatively executed. When the branch prediction is correct, processing efficiency is improved, but meanwhile, when the branch prediction is incorrect, the instructions speculatively executed are canceled in a pipeline, and thus the processing efficiency is reduced.

[Instruction Decoder]

Figure 9:
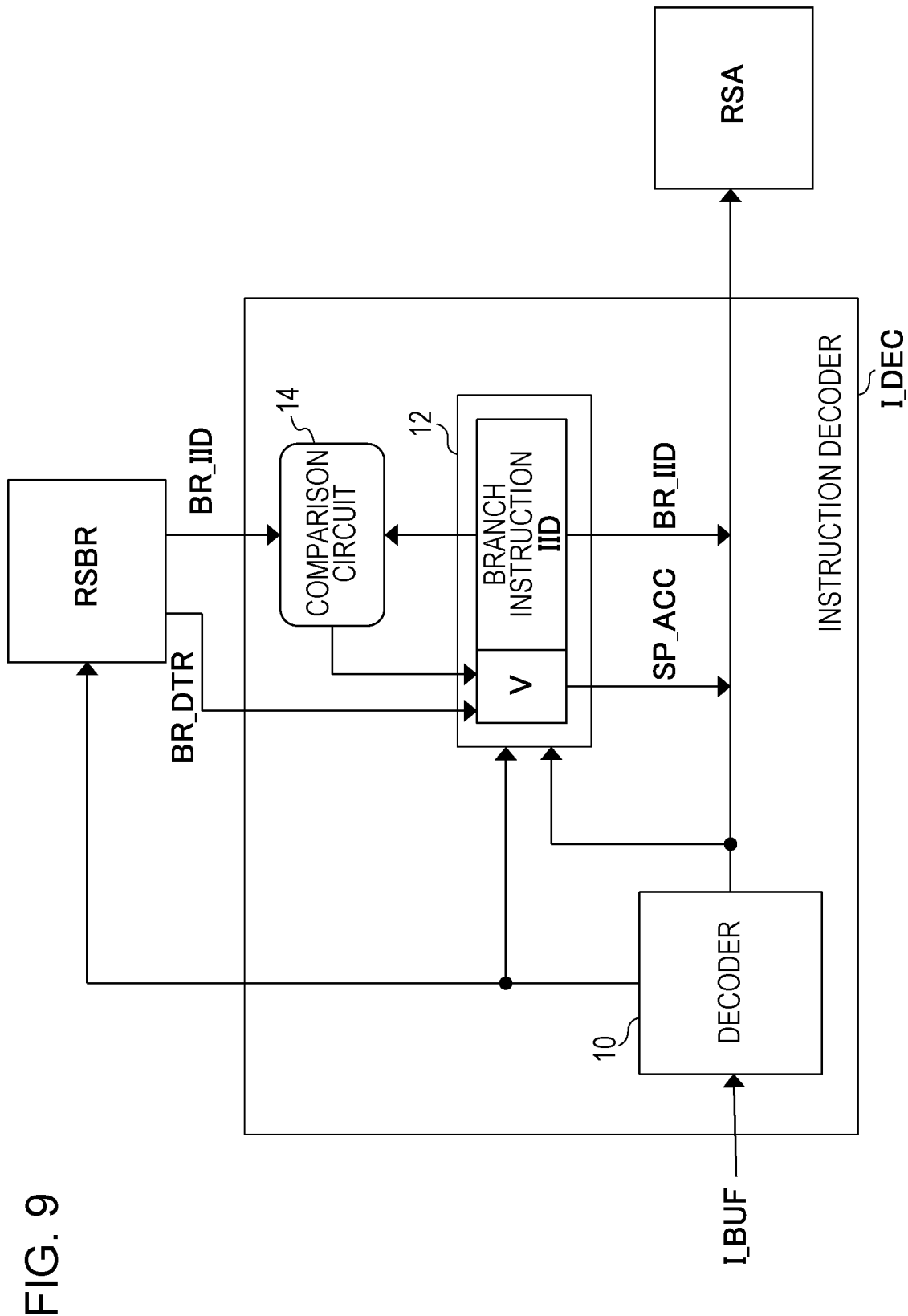
FIG. 9 is a diagram illustrating a configuration example of an instruction decoder in the present embodiment.

FIG. 9 is a diagram illustrating a configuration example of the instruction decoder in the present embodiment. The instruction decoder I_DEC is inputted with instructions in the instruction buffer I_BUF in order, decodes the instructions, issues branch instructions to the RSBR, and issues memory access instructions to the RSA.

The instruction decoder I_DEC includes a decoder 10 configured to decode a fetch instruction, a branch instruction buffer 12 for storing the instruction identifier BR_IID of a branch instruction and a valid bit V thereof, and a comparison circuit 14. The decoder 10 in the instruction decoder, decodes a branch instruction, assigns a BR_IID to the branch instruction, stores the branch instruction in the branch instruction buffer 12, and sets the valid bit V thereof to valid "1". The decoder 10 issues the branch instruction to the RSBR.

The RSBR, after a branch destination of the branch instruction is determined, sends a branch determination notification signal BR_DTR indicating the branch determination and the BR_IID of the branch instruction to the instruction decoder I_DEC. The comparison circuit 14 in the instruction decoder, compares the BR_IID in the branch instruction buffer 12 with the BR_IID added to a branch determination notification from the RSBR, and sets the valid bit V of the branch instruction buffer 12 to invalid "0", when both of the BR_IIDs match. This causes a branch-determined state.

After decoding a new branch instruction, the decoder 10 updates the branch instruction buffer 12 with an instruction identifier BR_IID of the new branch instruction. In this way, the branch instruction buffer 12 stores the BR_IID of the lastly decoded branch instruction, and the valid bit V indicating a branch-undetermined state (the valid bit V is "1") or a branch-determined state (the valid bit V is "0").

The instruction decoder adds, to a memory access instruction to be issued while a branch of a branch instruction is undetermined, the speculation flag SP_ACC indicating the memory access instruction to be speculatively executed, and the instruction identifier BR_IID (bridge instruction ID) of the undetermined branch instruction, and issues the memory access instruction to the RSA. The speculation flag SP_ACC is the same as the valid bit V of the branch instruction buffer 12.

On the other hand, the instruction decoder adds, to a memory access instruction to be issued after a branch of a branch instruction is determined, the invalid speculation flag SP_ACC=0, based on an invalid valid signal "0" indicating the branch determination of the branch instruction buffer 12, and issues the memory access instruction to the RSA. When this memory access instruction is executed, and a virtual address VA of the memory access instruction matches a virtual address VA of any of entries in the L1TLB, a TLB hit is determined to occur due to SP_ACC=0, in TLB cache determination in the L1 data cache. As a result, a memory access instruction to be non-speculatively executed is subjected to address translation by the TLB, and when a cache hit occurs in cache determination in the L1 data cache memory, data are read from the L1 data cache memory, and execution of the memory access instruction is ended.

As described above, the instruction decoder I_DEC adds, to the memory access instruction to be issued while the branch of the branch instruction is undetermined, the valid speculation flag SP_ACC and IID of the branch instruction, and issues the memory access instruction to the RSA. On the other hand, the memory access instruction to be issued after the branch is determined, is added with the invalid speculation flag SP_ACC and issued to the RSA.

As will be described later, a memory access instruction is stored in an entry created in an issue queue of the RSA. When the RSA issues the memory access instruction, the issued memory access instruction is stored in an entry created in a memory access queue in the L1 cache control unit. When the RSBR sends a branch determination notification signal of a branch instruction together with the instruction identifier BR_IID of the branch instruction to the RSA and the L1 cache control unit, and when branch prediction is correct, the speculation flag SP_ACC of the memory access instruction stored in the issue queue in the RSA is invalidated, and the speculation flag SP_ACC of the memory access instruction stored in the memory access queue of the L1 cache control unit is also invalidated.

[RSA]

Figure 10:
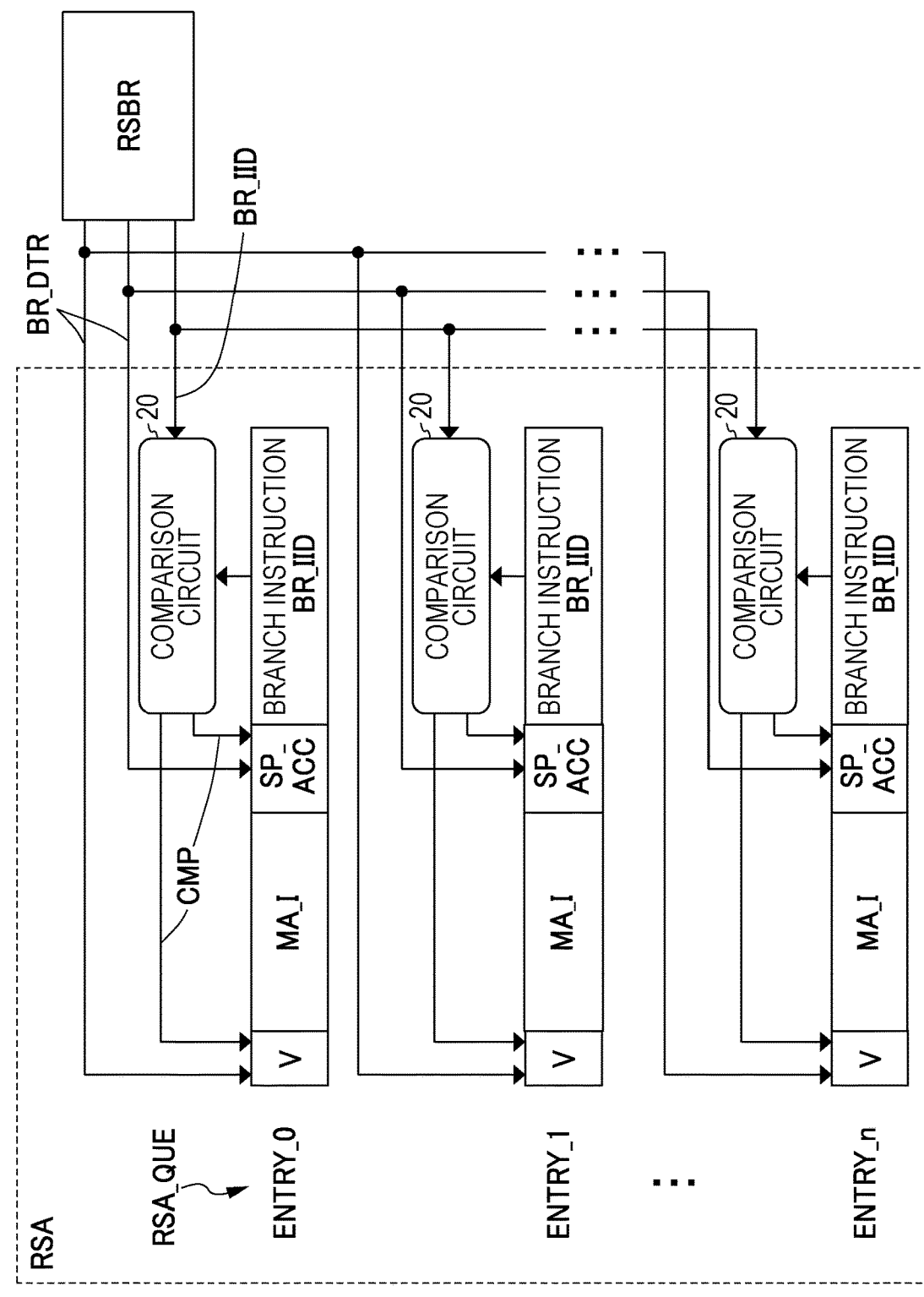
FIG. 10 is a diagram illustrating a configuration example of an RSA.

FIG. 10 is a diagram illustrating a configuration example of the RSA. The RSA includes an issue queue RSA_QUE, creates entries ENTRY_0 to ENTRY_n in the issue queue, registers a memory access instruction MA_I issued from the instruction decoder with the entry and queues the memory access instruction in. Information registered (stored) with each entry includes the valid bit V of the entry, information of the memory access instruction MA_I (a type indicating load or store, information about an access destination address, and the like), the speculation flag SP_ACC, and a BR_IID of a branch instruction.

Each entry in the issue queue in the RSA, when data for generating an operand address are prepared, and resources for the operand address generator and the L1 data cache become available, is issued to the storage unit SU. While each entry waits to be issued, and when a branch destination of a branch instruction corresponding to a BR_IID in the entry is determined, the branch determination notification BR_DTR, together with the BR_IID of the branch instruction for which the branch destination is determined and information indicating whether branch prediction succeeds or fails, is sent to all the entries, from the RSBR. In each entry, a comparison circuit 20 is provided for comparing the BR_IID of the branch determination notification BR_DTR with the BR_IID in the entry, and outputting a comparison result CMP.

The speculation flag SP_ACC of the memory access instruction in the entry in the issue queue RSA_QUE is invalidated, when the branch of the branch instruction is determined as branch prediction success. The valid bit of the memory access instruction in the entry is invalidated, when the branch of the branch instruction is determined as branch prediction failure. These processes are the same as control for a memory access instruction in an entry in the memory access queue in the L1 data cache. Accordingly, control for an entry in the issue queue RSA_QUE when a branch of a branch instruction is determined will be described later together with the memory access queue.

[L1 Data Cache and Memory Access Queue of the Same]

Figure 11:
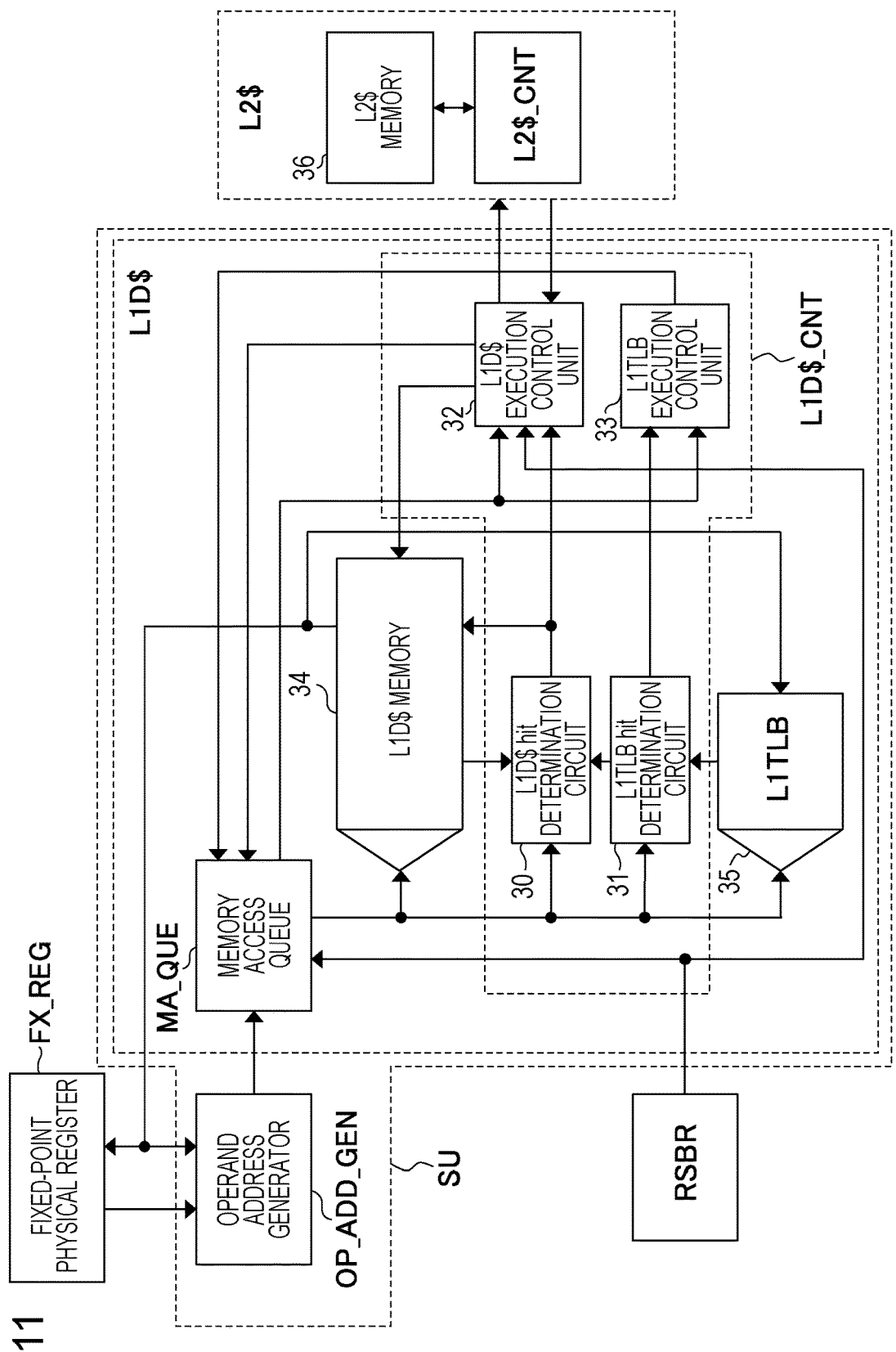
FIG. 11 is a diagram illustrating a configuration of an L1 data cache.

FIG. 11 is a diagram illustrating a configuration of the L1 data cache unit. The L1 data cache unit (hereinafter, abbreviated and referred to as the L1 data cache) L1D$ configures, together with the operand address generator OP_AD-D_GEN, the storage unit SU. A memory access instruction issued from the RSA, for which an operand address is generated by the operand address generator, creates an entry in a memory access queue MA_QUE in the L1 data cache. In this entry, information about the memory access instruction, the speculation flag SP_ACC, a BR_IID of a branch instruction, and an L1TLB miss flag L1TLB_MISS indicating that a TLB miss has occurred due to speculative access prohibition for a specific address in the L1 data cache described later are registered (stored).

An L1 data cache memory 34 and an L1TLB 35 are included in the L1 data cache L1D$. In the L1 data cache memory 34, part of data in the main memory is stored together with tag information thereof. In the L1TLB 35, part of translation table entries (TTE) in the main memory is stored.

The L1 data cache unit L1D$ includes an L1 data cache control unit L1D$_CNT configured to perform cache control for the memory access instruction in the entry put in from the memory access queue. The L1 data cache control unit L1D$_CNT includes an L1TLB hit determination circuit 31, an L1 data cache hit determination circuit 30, an L1TLB execution control unit 33, and an L1 data cache execution control unit 32.

When the entry in the memory access queue MA_QUE is put (inputted) in a pipeline circuit of the L1 data cache control unit L1D$_CNT, the L1 data cache control unit L1D$_CNT reads virtual addresses from all entries in the L1TLB 35, and sends the virtual addresses to the L1TLB hit determination circuit 31. The L1TLB hit determination circuit 31, by determining whether a virtual address of the put-in entry matches all the virtual addresses of the entries in the L1TLB 35 or not, determines whether the virtual address of the put-in entry matches the virtual address of any of the entries in the L1TLB 35 or does not match all the virtual addresses of the entries.

When the virtual address of the put-in entry matches any of the virtual addresses of the entries in the L1TLB 35, based on the speculation flag SP_ACC of the memory access instruction, and the speculative access prohibition flag INH_SP_ACC in a TLB entry whose virtual address matches the virtual address of the put-in entry, whether a TLB miss occurs due to the speculative access prohibition for the specific address or not is determined. (1) When the speculation flag is valid (SP_ACC=1) and the speculative access prohibition flag is valid (INH_SP_ACC=1), then a TLB miss occurs due to the speculative access prohibition for the specific address, data are not requested to the L2 cache, and the memory access instruction is interrupted and sent back to the memory access queue. (2) On the other hand, when the speculation flag is invalid (SP_ACC=0) or the speculative access prohibition flag is invalid (INH_SP_ACC=0), then a TLB hit is determined to occur.

Conversely, when all the entries in the L1TLB 35 do not match the put-in entry, a normal TLB miss occurs, the L1TLB execution control unit requests data to the L2 cache, and the L1TLB is updated.

When the TLB hit is determined to occur, an address after conversion is read from the L1TLB 35, and sent to the L1 data cache hit determination circuit 30. The L1 data cache hit determination circuit 30, based on the operand address, reads tag data from the L1 data cache memory 34, and based on the tag data and the physical address after conversion, performs L1 data cache hit determination.

In a case of a data cache hit, the L1 data cache execution control unit 32, reads data from the L1 data cache memory 34 as usual, and responds with the data. Due to this data response, the read data are stored in the renaming register in the fixed-point physical register file FX_REG.

On the other hand, in a case of a data cache miss, the L1 data cache execution control unit 32 issues a data request for requesting data to the L2 cache.

The L2 cache unit L2$ includes an L2 cache memory 36, and an L2 cache control unit L2$_CNT. The L2 cache control unit processes the data request issued by the L1 data cache control unit, and in a case of an L2 cache hit, reads data from the L2 cache memory 36, or in a case of an L2 cache miss, reads data from the main memory, and responds with the data to the L1 data cache execution control unit 32 or the L1TLB execution control unit 33 of the L1 data cache control unit.

Figure 12:
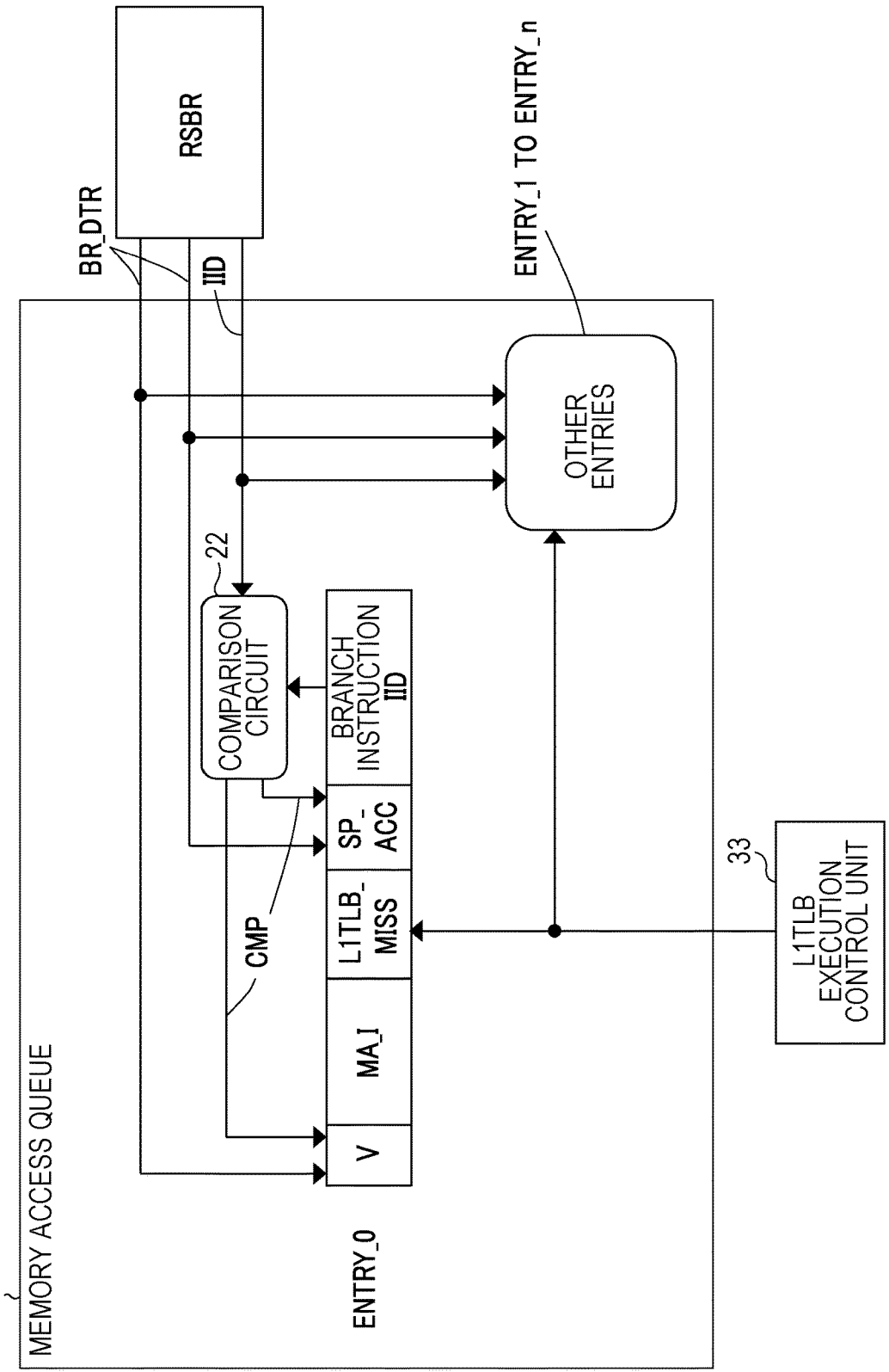
FIG. 12 is a diagram illustrating a configuration of a memory access queue.

FIG. 12 is a diagram illustrating a configuration of the memory access queue. The memory access queue MA_QUE, as in the queue in the RSA, includes the plurality of entries ENTRY_0 to ENTRY_n. However, in FIG. 12, only one entry ENTRY_0 is illustrated, and the other entries ENTRY_1 to ENTRY_n are illustrated together. Each entry in the memory access queue is provided with a comparison circuit 22 configured to compare a BR_IID added to the branch determination notification BR_DTR from the RSBR with the BR_IID in the entry.

In each entry in the memory access queue, the valid bit V, data of the memory access instruction MA_I, the speculation flag SP_ACC, and the BR_IID of the branch instruction are stored, and further, unlike the queue in the RSA, the L1TLB miss flag L1TLB_MISS indicating that a TLB miss has occurred in speculative access for a specific address for the entry is stored.

When an entry is created in the memory access queue, the valid bit V is set to valid "1", and when an execution process for the entry ends, the valid bit is set to invalid "0". The data of the memory access instruction MA_I, the speculation flag SP_ACC, and the BR_IID of the branch instruction are stored in a state when the memory access instruction is issued from the RSA. On the other hand, the L1TLB miss flag L1TLB_MISS is in a state of invalid "0" when the entry is created. When the entry is executed, and a TLB miss occurs due to the speculative access prohibition for a specific address, the L1TLB miss flag L1TLB_MISS is changed to valid "1" by the L1TLB execution control unit 33.

Once the L1TLB miss flag L1TLB_MISS is validated, the entry is not issued from the memory access queue, as long as the speculation flag SP_ACC is valid. A reason is that, even when the entry is issued, the TLB miss occurs again due to the speculative access prohibition for the specific address, the data request to the L2 cache is suppressed, execution of the instruction is interrupted, and the entry is sent back to the memory access queue. When a branch of the branch instruction is determined as branch prediction success, and the speculation flag SP_ACC is invalidated, the entry is issued from the memory access queue.

Figure 13:
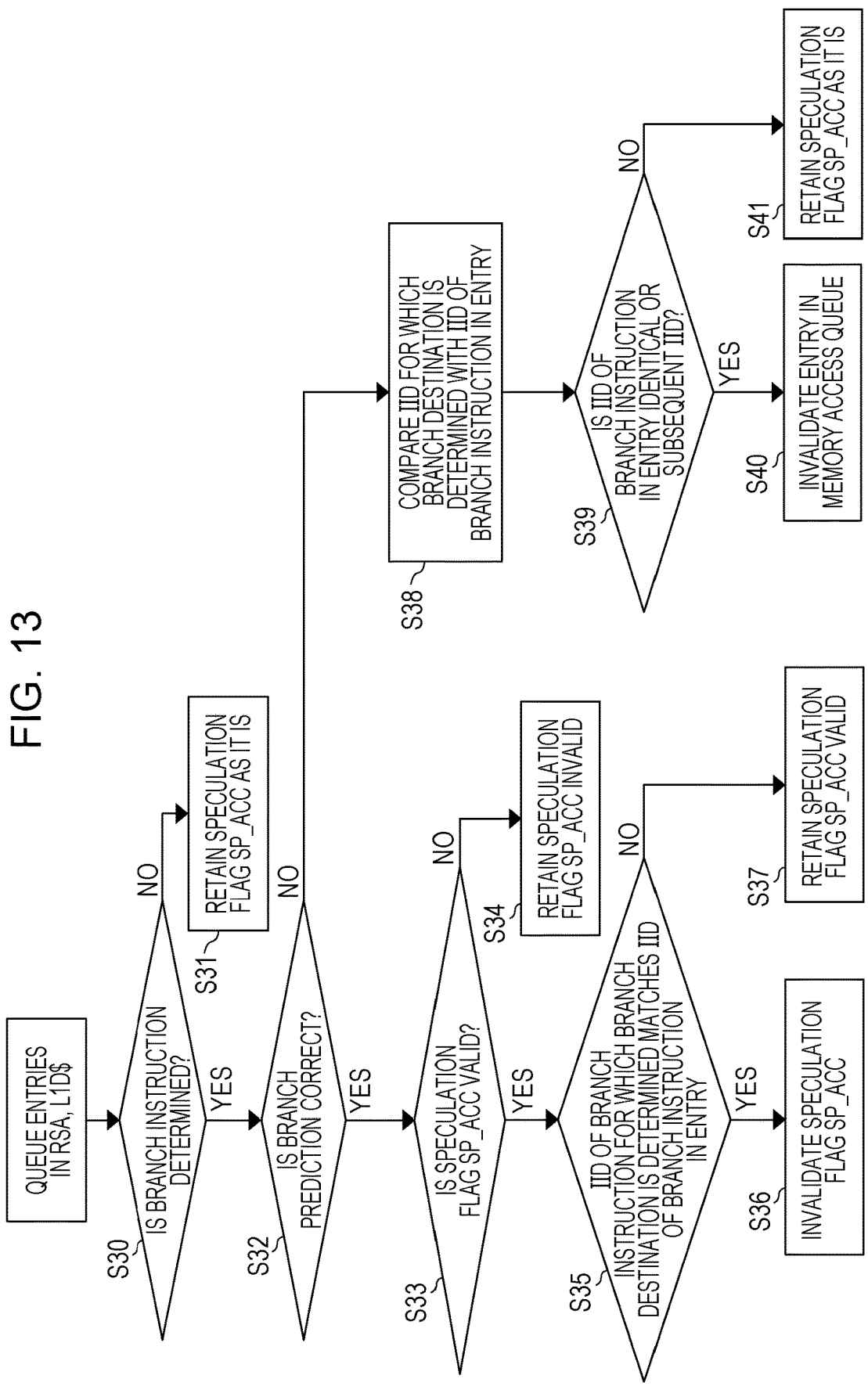
FIG. 13 is a flowchart diagram illustrating control, in a case where a branch has been determined, for speculation flags for respective entries in an issue queue of the RSA and in a memory access queue in an L1 data cache.

FIG. 13 is a flowchart diagram illustrating control, in a case where the branch has been determined, for the speculation flags of the respective entries in the issue queue of the RSA and in the memory access queue in the L1 data cache. With reference to FIG. 13, the control for the speculation flag in the entry in the RSA in FIG. 10, and the control for the speculation flag in the entry in the memory access queue in FIG. 12, when the branch is determined, will be described together.

When a branch instruction is not determined (S30: NO), there is no branch determination notification notifying, from the RSBR, that a branch destination of the branch instruction has been determined, and the speculation flag SP_ACC in an entry is retained as it is (S31). On the other hand, when the branch instruction is determined (S30: YES), the branch determination notification BR_DTR is sent from the RSBR to the issue queue in the RSA and the memory access queue in the L1 data cache.

In a case where branch prediction in the branch determination notification is correct (S32: YES), when a speculation flag in each entry is valid "1" (S33: YES), and the BR_IID of the branch instruction, for which a branch destination has been determined, added to the branch determination notification is determined to match a BR_IID of a branch instruction in an entry by the comparison circuit 20 (S35: YES), each of the RSA and the L1 data cache control unit changes the speculation flag SP_ACC of the entry to invalid "0" (S36). Accordingly, the memory access instruction in the entry turns to an instruction to be non-speculatively executed. The speculation flag SP_ACC of a non-matching entry is retained as valid (S37).

On the other hand, when the branch prediction in the branch determination notification is incorrect (S32: NO), the comparison circuit 20 compares the BR_IID of the branch instruction, for which the branch destination has been determined, added to the branch determination notification with a BR_IID of a branch instruction in an entry (S38), and when the BR_IID of the branch instruction in the entry matches the BR_IID of the branch instruction for which the branch has been determined, or matches a BR_IID of a subsequent branch instruction (S39: YES), each of the RSA and the L1 data cache control unit invalidates the valid bit V of the entry, because this case indicates speculation failure (S40). This cancels the instruction in the invalidated entry. On the other hand, each of the RSA and the L1 data cache control unit, when the BR_IID of the branch instruction in the entry do not match the BR_IID of the branch instruction for which the branch has been determined, or do not match the BR_IID of the subsequent branch instruction thereof (S39: NO), retains the speculation flag SP_ACC of the entry as it is (S41).

Figure 14:
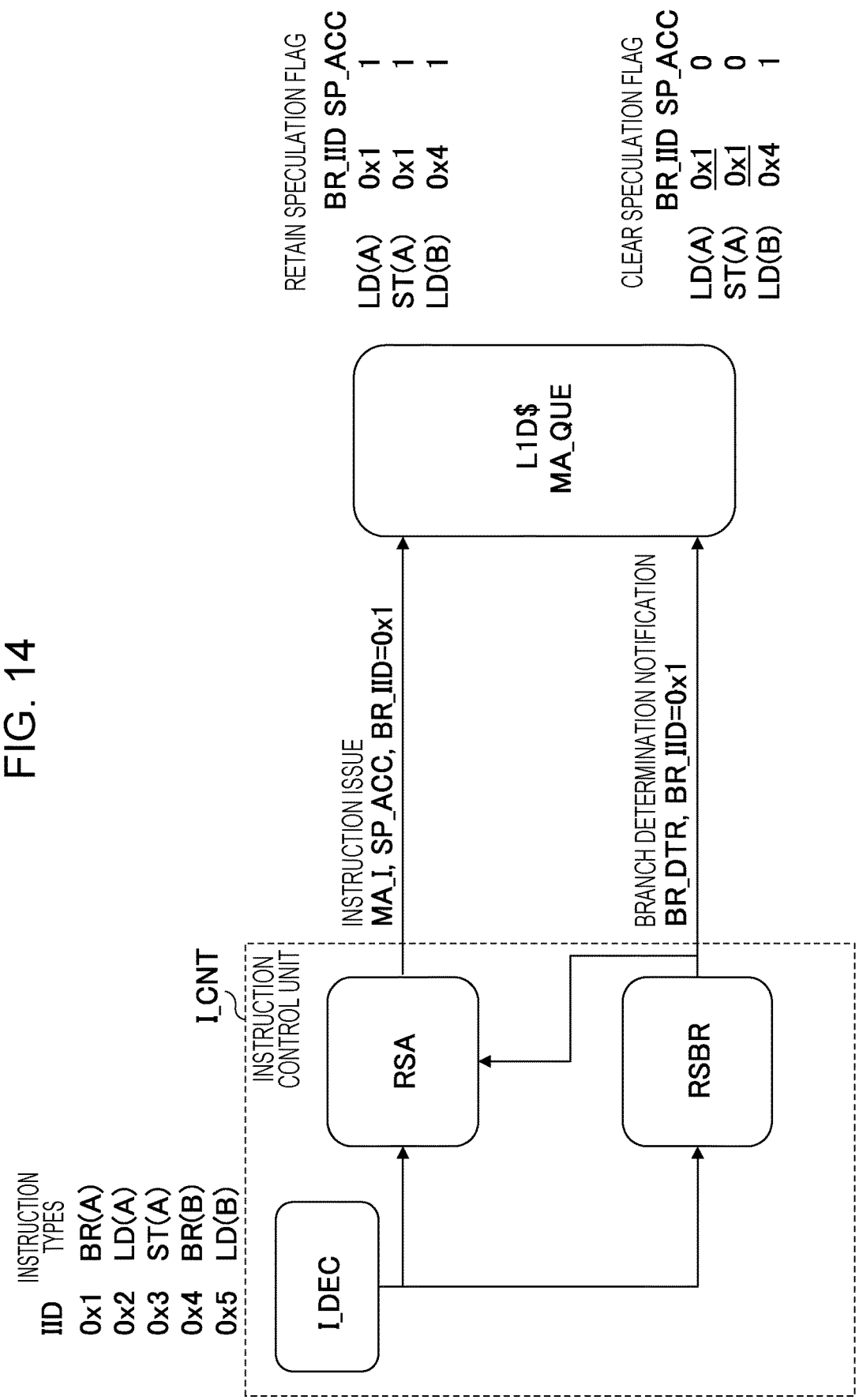
FIG. 14 is a diagram illustrating an entry example of the memory access queue in the L1 data cache, and a control example when a branch is determined.

FIG. 14 is a diagram illustrating an entry example of the memory access queue in the L1 data cache, and a control example when a branch is determined. First, the instruction decoder I_DEC in the instruction control unit I_CNT issues five instructions IID=0x1 to 0x5 to the RSA or the RSBR. The instruction decoder I_DEC, among the five instructions, issues branch instructions BR(A) and BR(B) to the RSBR, and issues a load instruction LD(A), a store instruction ST(A), and a load instruction LD(B) that are memory access instructions to the RSA. Respective entries for the load instruction LD(A), the store instruction ST(A), and the load instruction LD(B) are created in the issue queue of the RSA.

The RSA issues the entry in the issue queue to the L1 data cache unit L1D$, and creates an entry in the memory access queue MA_QUE. Each of these memory access instructions is, in addition to information of the memory access instruction MA_I such as an instruction type or access information, added with the speculation flag SP_ACC, a BR_IID of a previous branch instruction, and the L1TLB miss flag L1TLB_MISS.

Respective entries for the three instructions LD(A), ST(A), and LD(B) are created in the memory access queue, and the respective speculation flags SP_ACC are all valid "1". In this state, the RSBR sends the branch determination notification BR_DTR indicating that a branch has been determined for the branch instruction BR(A) (BR_IID=0x1) as branch prediction success, to the RSA and the L1 data cache. This branch determination notification BR_DTR is added with information indicating success/failure of the branch prediction and the BR_IID of the branch instruction for which the branch has been determined.

In response to this branch determination notification BR_DTR, the respective speculation flags SP_ACC of the instructions LD(A) and ST(A) with the BR_IID=0x1 among the branch instructions in the memory access queue are changed from valid "1" to invalid "0".

[L1TLB and L1TLB Hit Determination Circuit in L1 Data Cache]

Figure 15:
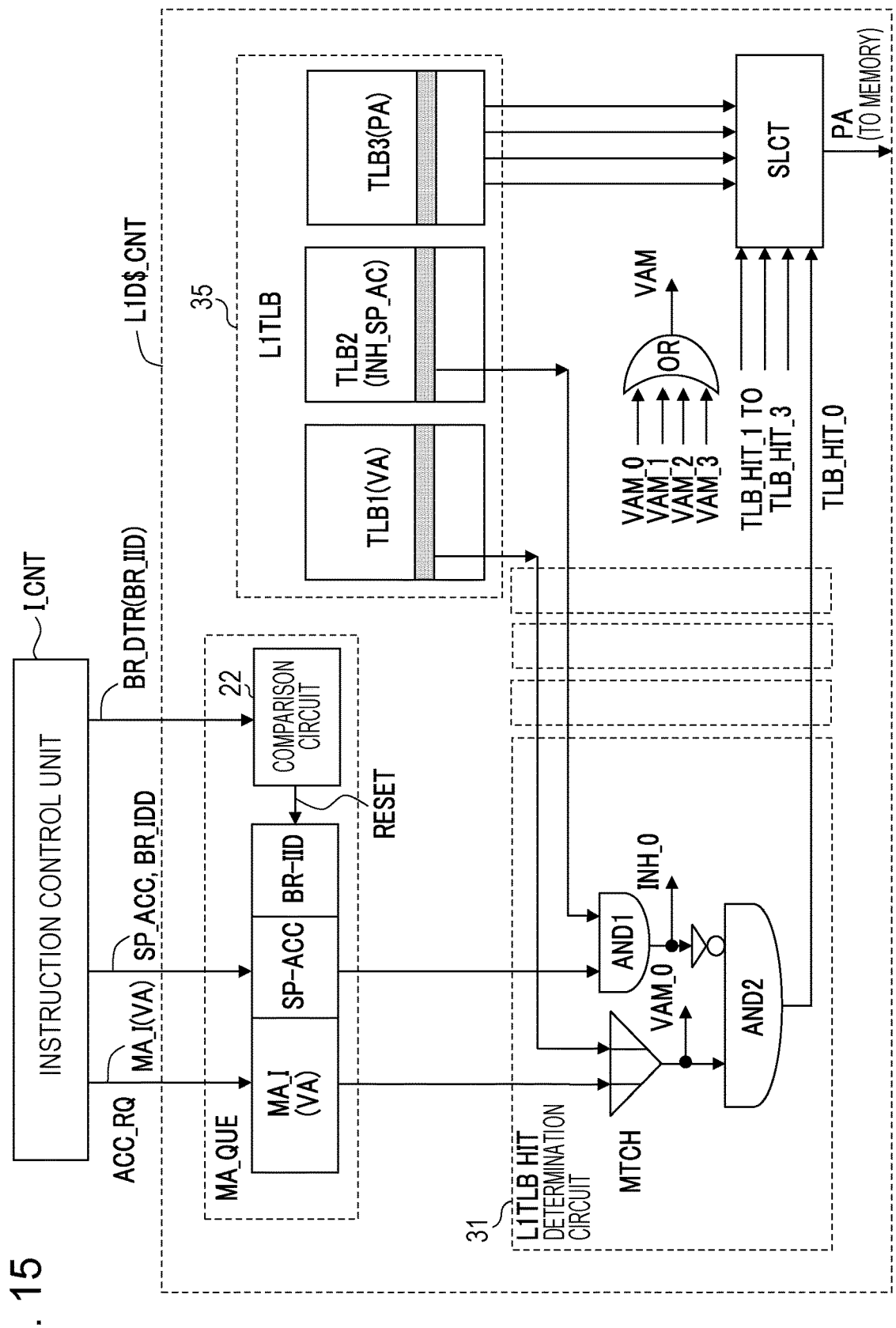
FIG. 15 is a diagram illustrating an example of an L1TLB and an L1TLB hit determination circuit in the L1 data cache.

FIG. 15 is a diagram illustrating an example of the L1TLB and the L1TLB hit determination circuit in the L1 data cache. In FIG. 15, the instruction control unit I_CNT of the RSA, the RSBR, or the like, the memory access queue MA_QUE in the L1 data cache control unit L1D$_CNT, a configuration example of the L1TLB 35, and an example of a logical configuration of the L1TLB hit determination circuit 31 are illustrated.

The memory access queue MA_QUE includes the comparison circuit 22 configured to compare a BR_IID of an entry ENTRY with a BR_IID of a branch instruction. Information of the memory access instruction MA_I including an access destination address, the speculation flag SP_ACC, and the BR_IID of the branch instruction are stored in the entry ENTRY. Part of the access destination address of the memory access instruction MA_I is the virtual address VA. The L1TLB miss flag L1TLB_MISS is omitted.

The L1TLB includes a plurality of entries. In the example in FIG. 15, the L1TLB includes four entries ENTRY. The L1TLB includes a TLB1 for storing the virtual address VA, a TLB3 for storing the physical address PA after conversion, and a TLB2 for storing the speculative access prohibition flag INH_SP_ACC. Similarly, a translation table entry (TTE) in the main memory also stores the virtual address VA, the speculative access prohibition flag INH_SP_ACC, and the physical address PA. In the L1TLB, some entries in the translation table entries (TTE) in the main memory are stored.

When the processor executes a plurality of programs (or processes) in parallel, and virtual addresses overlap among the plurality of programs, a context ID as an identifier of each program and the virtual address VA are stored in the TLB1.

Next, the L1TLB hit determination circuit 31 is provided for each entry ENTRY in the L1TLB. In FIG. 15, four L1TLb hit determination circuits 31 are illustrated, and an internal logical circuit is illustrated only for a leftmost L1TLB hit determination circuit. The L1TLB hit determination circuit 31 includes a virtual address matching circuit (matching circuit) MTCH determining whether the virtual address VA of the memory access instruction of the entry in the memory access queue matches the virtual address VA of the entry in the L1TLB or not. The virtual address matching circuit MTCH outputs a virtual address match signal VAM_0.

The L1TLB hit determination circuit 31 includes a speculative access prohibition detection circuit AND1 configured to output a logical product (AND) of the speculation flag SP_ACC of the memory access instruction in the entry ENTRY in the memory access queue and the speculative access prohibition flag INH_SP_ACC in the entry ENTRY in the L1TLB. The speculative access prohibition detection circuit AND1 outputs a speculative access prohibition signal INH_0 indicating whether SP_ACC=1 and INH_SP_ACC=1 are true or not.

The L1TLB hit determination circuit 31 includes an AND circuit AND2 configured to output a logical product of the virtual address match signal VAM_0 and an inversed signal of the speculative access prohibition signal INH_0 (an inversed signal by an inverter INV), and the AND circuit AND2 outputs a TLB hit signal TLB_HIT_0.

The other three L1TLB hit determination circuits 31 have the same configuration as that described above, and individually output a TLB hit signal TLB_HIT1, TLB_HIT_2, or TLB_HIT_3. An OR circuit OR configured to output a logical sum of four virtual address match signals VAM_0 to VAM_3 is further included. An output VAM from the OR circuit OR is set to "1" when a virtual address of any one of entries matches the virtual address of the memory access instruction, and the output VAM is set to "0" when all the entries do not match the virtual address of the memory access instruction.

A selector SLCT selects one physical address PA among the physical addresses PA of the four entries in the TLB3 in the L1TLB, based on the TLB hit signals TLB_HIT_0 to TLB_HIT_3 outputted from the respective four L1TLB hit determination circuits 31.

The virtual address matching circuit MTCH performs either an operation in which the virtual address match signal VAM_# is set to "1" only for any one of the entries in the L1TLB, or an operation in which the virtual address match signals VAM_# are set to "0" for all the entries. The speculative access prohibition detection circuit AND1, when the speculation flag of the put-in memory access instruction satisfies SP_ACC=1, sets the speculative access prohibition signal INH_# to "1" only for the entry for which the speculative access prohibition flag satisfies INH_SP_ACC=1.

LTB hit determination by the L1TLB hit determination circuit 31 is performed as follows.

(1) In a case where the virtual address matching circuit MTCH sets the virtual address match signal VAM_# to "1" only for any one of the entries in the L1TLB (the output VAM from the OR circuit OR is "1").

(1-1) When the output INH_# from the speculative access prohibition detection circuit AND1 for the matching entry is true "1", this case is determined as a TLB miss due to the speculative access prohibition for the specific address. In this case, all the TLB hit signals TLB_HIT_# of the output from the AND circuit AND2 are set to "0", and the selector SLCT selects none of the physical addresses PA. Thus, TLB conversion is not performed. This case falls into a case of YES in S61 and YES in S62 in FIG. 17 described later.

(1-2) When the output INH_# from the speculative access prohibition detection circuit AND1 for the matching entry is false "0", this case is determined as a TLB hit. In this case, only one of the TLB hit signals TLB_HIT_# (#=0 to 3) of the output from the AND circuit AND2 is set to "1", and the selector SLCT selects one of the physical addresses PA. This case falls into a case of YES in S61 and NO in S62 in FIG. 17 described later.

(2) When the virtual address matching circuit MTCH sets the virtual address match signals VAM_# to "0" for all the entries in the L1TLB (the output VAM from the OR circuit OR is "0"), checking a result of the speculative access prohibition detection circuit AND1 is not required, and thus this case is determined as a normal TLB miss. In this case, all the TLB hit signals TLB_HIT_# of the output from the AND circuit AND2 are set to "0", and the selector SLCT selects none of the physical addresses. This case falls into a case of NO in S61 in FIG. 17 described later.

As described above, both in (1-1) and (2), since all the TLB hit signals TLB_HIT_# are set to "0", and the selector SLCT selects none of the physical addresses of the entries, these cases fall into a TLB miss. However, in the case of (1-1), although the virtual address match signal VAM_# for any one of the entries is set to "1" and the speculative access prohibition signal INH_# for the entry is set to "1", in the case of (2), the virtual address match signals VAM_# for all the entries are set to "0", and thus (1-1) is determined as a TLB miss due to the speculative access prohibition for the specific address, and (2) is determined as a normal TLB miss.

[Execution Processing of Memory Access Instruction in L1 Data Cache]

Figure 16:
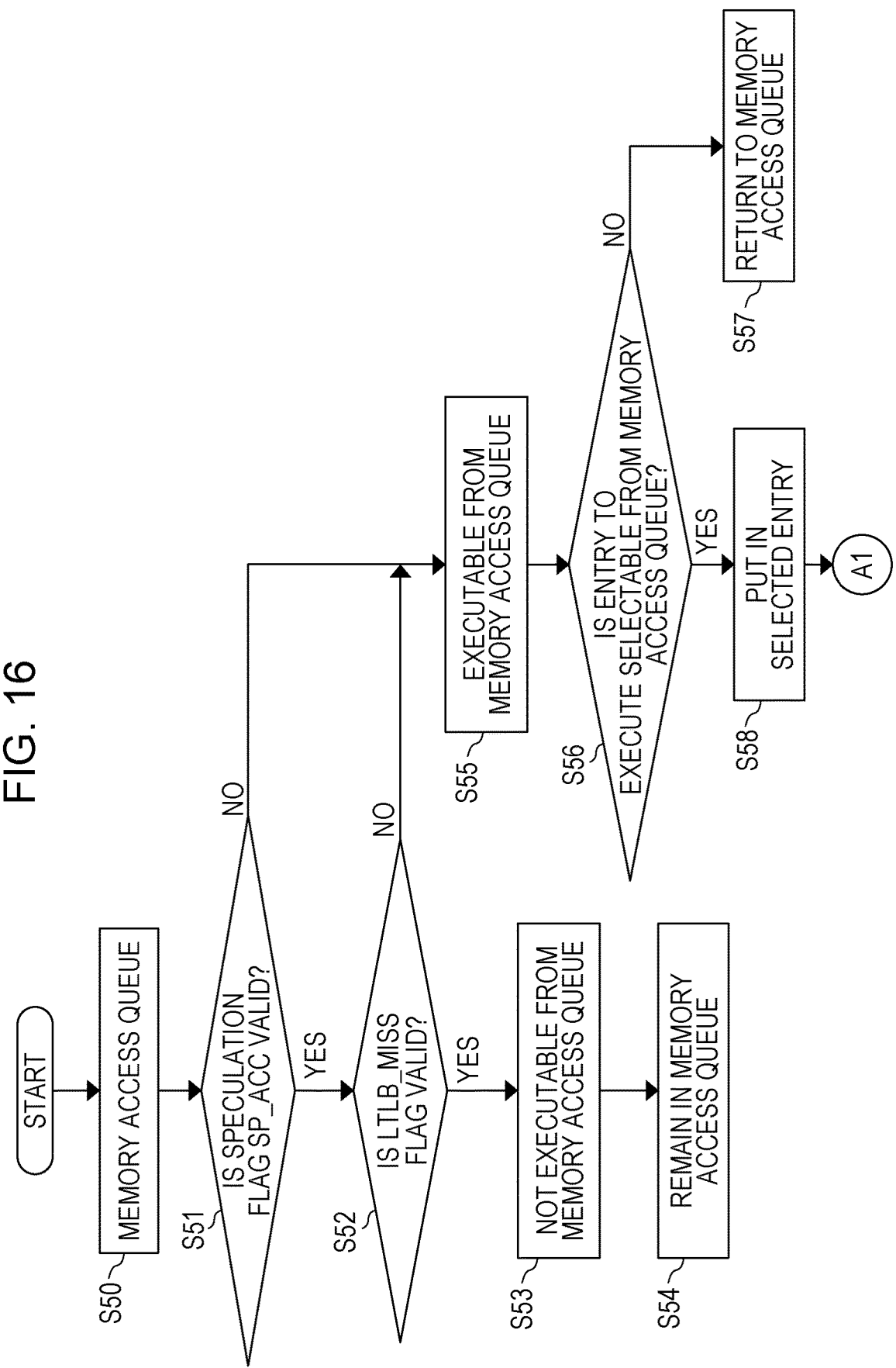
FIG. 16 is a flowchart diagram illustrating a first example of execution processing of a memory access instruction in an L1 cache.
Figure 17:
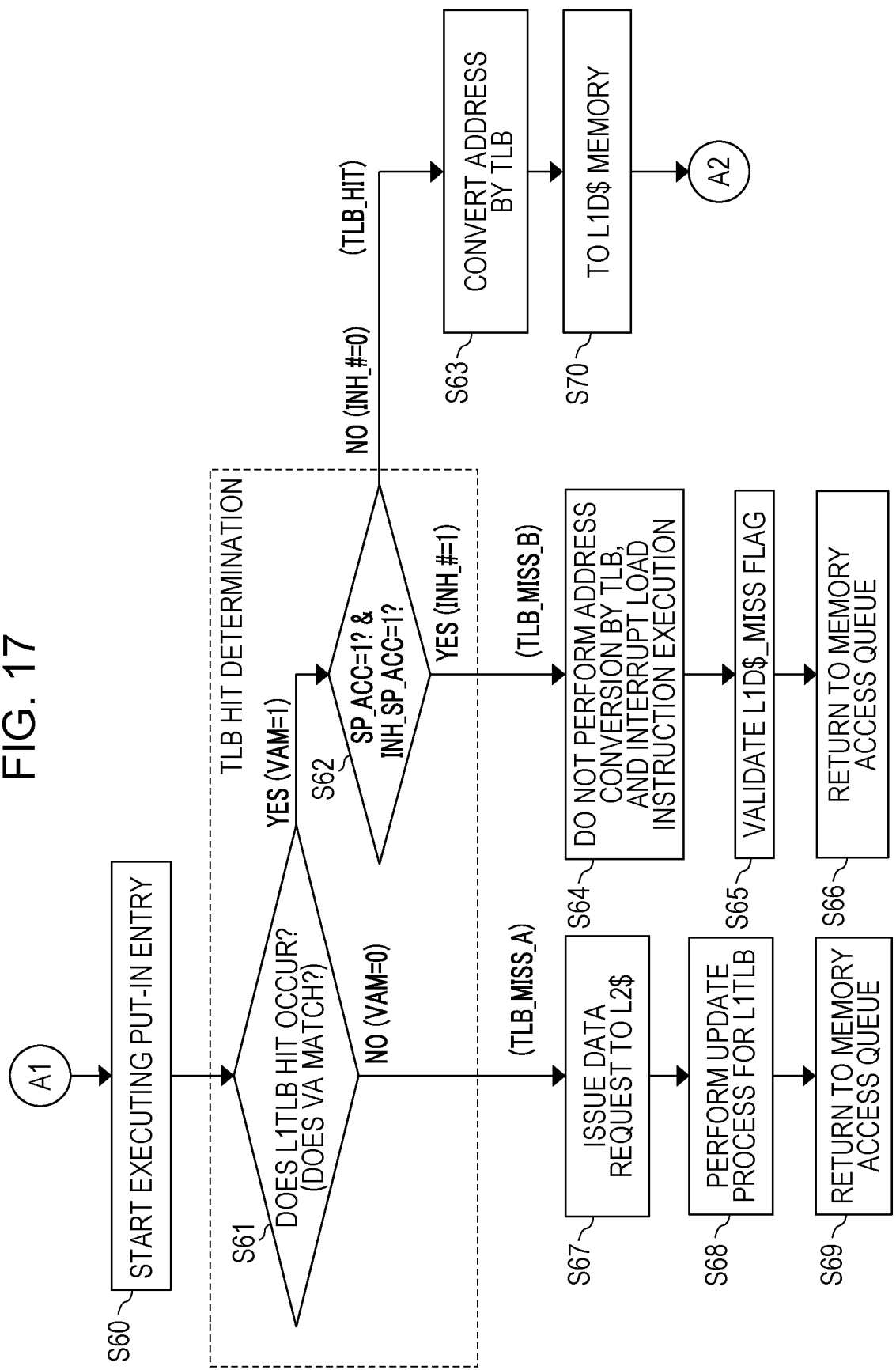
FIG. 17 is the flowchart diagram illustrating the first example of the execution processing of the memory access instruction in the L1 cache.
Figure 18:
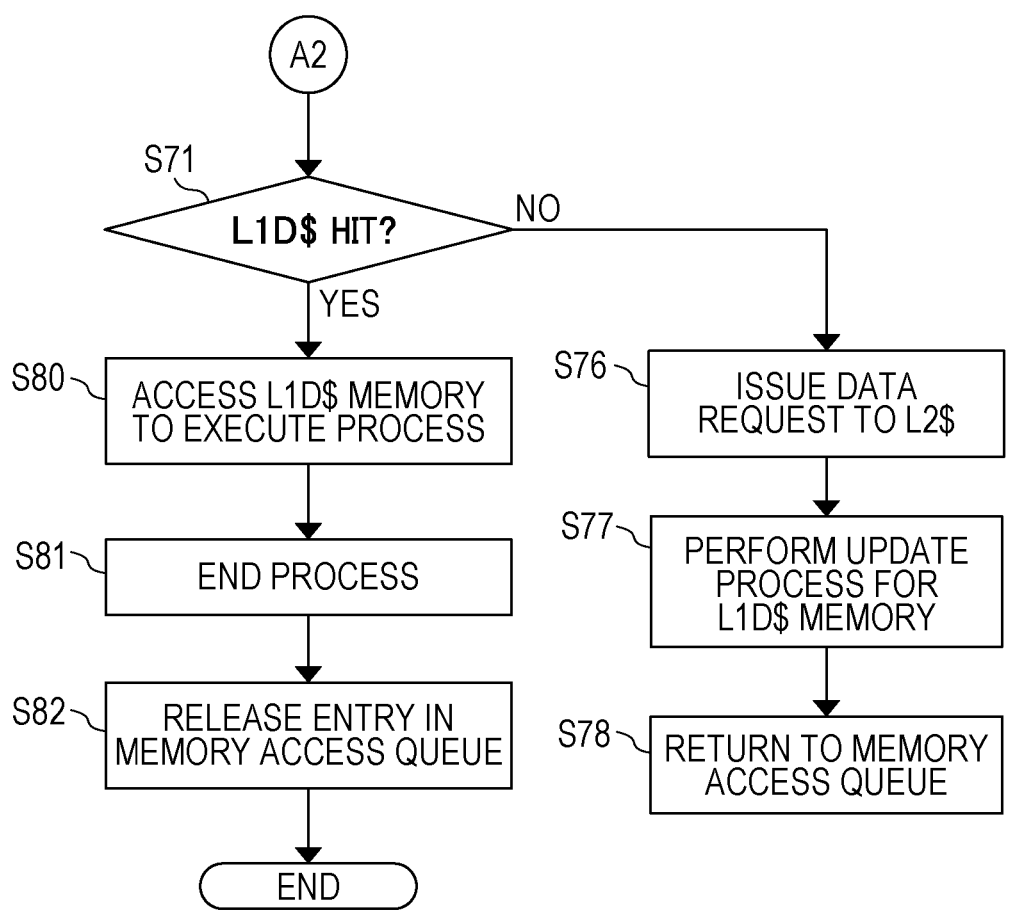
FIG. 18 is the flowchart diagram illustrating the first example of the execution processing of the memory access instruction in the L1 cache.

FIG. 16, FIG. 17, and FIG. 18 are flowchart diagrams illustrating a first example of execution processing of a memory access instruction in the L1 cache. FIG. 16 illustrates put-in control of entries in a memory access queue of the L1 cache, FIG. 17 illustrates L1TLB cache hit determination in the L1 data cache control unit and processing for a case of a TLB miss, and FIG. 18 illustrates L1 data cache hit determination in the L1 data cache control unit and processing for the L1 data cache memory.

With reference to FIG. 16, the put-in control of the entries in the memory access queue of the L1 data cache will be described. For an entry in the memory access queue (S50), when the speculation flag SP_ACC is valid "1" (S51: YES), and the L1TLB miss flag L1TLB_MISS is valid "1" (S52: YES), the entry is not executable (S53), and the entry stays (remains) in the memory access queue (S54). The L1TLB miss flag L1TLB_MISS is a flag validated when a TLB miss occurs due to the speculative access prohibition for the specific address described above. Since this entry, even when executed in the L1 data cache, causes the TLB miss again due the speculative access prohibition for the specific address in the L1 data cache L1D$, and is sent back to the memory access queue, the entry is not put in from the memory access queue until the speculation flag is invalidated when a branch is determined.

On the other hand, for an entry in the memory access queue (S50), when the speculation flag SP_ACC is invalid "0" (S51: NO), or when the L1TLB miss flag L1TLB_MISS is invalid "0" (S52: NO), the entry is executable from the memory access queue (S55). When an executable entry is selectable from the memory access queue (S56: YES), the selected entry is put (inputted) in the L1 data cache control unit (S58). When not selectable (S56: NO), the entry is sent back to the memory access queue (S57). The case in which an executable entry is selectable is a case in which a plurality of executable entries exists and an executable entry older than the executable entry during processing is selected, and the like.

Next, with reference to FIG. 17 and FIG. 18, control in the L1 data cache control unit will be described. In FIG. 17, the L1 data cache control unit starts execution of the entry put in from the memory access queue (S60). First, the L1TLB hit determination circuit 31 of the L1 data cache control unit performs TLB hit determination in the L1TLB 35 (S61, S62). In the TLB hit determination, the L1TLB hit determination circuit determines, based on the output VAM from the OR circuit OR that outputs a logical sum of the virtual address match signals VAM_# in the virtual address matching circuit MTCH in FIG. 15, whether the virtual address VA of the put-in entry matches that of any one of the entries (VAM=1), or the virtual address do not match those of all the entries (VAM=0) (S61).

(1) When the virtual address VA matches that of any one of the entries (VAM=1, S61: YES), based on the speculative access prohibition signal INH_# in the speculative access prohibition detection circuit AND1 for the matching entry, whether the memory access instruction is being speculatively executed (SP_ACC=1), and the matching entry has an address to which access is prohibited in a speculative execution memory access instruction (INH_SP_ACC=1) or not is determined (S62).

(1-1) When the speculative access prohibition signal satisfies INH_#=1, the matching entry is determined to be an entry having an address to which the speculative access is prohibited, and this case is determined as a TLB miss due to the speculative access prohibition for the specific address (S62: YES). In this case, the L1TLB execution control unit 33 of the L1 data cache control unit does not perform address translation by the TLB, interrupts execution of the entry of the memory access instruction (S64), sets the L1TLB miss flag L1TLB_MISS to valid "1" (S65), and sends the memory access instruction back to the memory access queue (S66).

(1) In the case where the virtual address VA matches that of any one of the entries (VAM=1, S61: YES).

(1-2) When the speculative access prohibition signal satisfies INH_#=0, the matching entry is determined not to be an entry having an address to which the speculative access is prohibited, and this case is determined as a TLB hit (S62: NO). In this case, the L1 data cache control unit obtains the physical address PA after conversion by performing address translation by the TLB (S63), and transits to control for the L1 data cache memory (S70).

(2) When the virtual address VA does not match those of all the entries (VAM=0, S61: NO), this case is determined as a normal TLB miss. In this case, there is no entry having the virtual address VA matching the virtual address VA of the memory access instruction, and thus determination for the speculative access prohibition signal INH_# has no meaning. The L1TLB execution control unit 33 of the L1 data cache control unit issues a data request requesting TLB data to the L2 cache (S67), updates the L1TLB with the TLB data with which the L2 cache responds (S68), and sends the memory access instruction back to the memory access queue (S69). Subsequently, the memory access instruction is put in the pipeline of the L1 data cache control unit again, and this case is determined as a L1TLB hit (S61: YES, S62: NO).

After the TLB hit occurs in the L1 data cache, in FIG. 18, the L1 data cache hit determination circuit 30 reads tag information in the L1 data cache memory, and performs data cache hit determination (S71). When a data cache hit is determined to occur (S71: YES), the L1 data cache execution control unit 32 reads data from the L1 data cache memory and responds with the data (S80). Accordingly, the execution process of the entry ends (S81), the valid bit V of the entry is invalidated, and the entry is released from the memory access queue (S82).

On the other hand, when a data cache miss is determined to occur (S71: NO), the L1 data cache execution control unit 32, issues a data request to the L2 cache (S76), and updates the L1 data cache memory 34 with the data read from the L2 cache (access destination data) (S77). Then, the entry is once sent back to the memory access queue (S78). In this case, when the entry is put in from the memory access queue again, a data cache hit occurs in the L1 data cache memory (S71: YES), data are read from the L1 data cache memory, response with the data is performed (S80) and the process is ended (S81).

As another example for execution processing of a memory access instruction in the L1 data cache, the L1TLB miss flag L1TLB_MISS is not required to be stored in an entry in the memory access queue of the L1 data cache, and even when a TLB miss occurs due to the speculative access prohibition for the specific address in the L1 data cache, the L1TLB miss flag may be validated so as not to, after that, perform control for making the entry stay in the memory access queue. However, in this case, the memory access instruction causing the TLB miss due to the speculative memory access for the specific address is put in again from the memory access queue, and repeats the similar TLB miss in some cases.

As described above, according to the present embodiment, the determination of whether or not the memory access instruction for which the branch instruction is speculatively executed while the branch is undetermined is the memory access instruction for the specific address for which the speculative access is prohibited is determined by the L1TLB hit determination. In the case when it is determined that speculative access instruction is for the specific address, the address translation by the L1TLB is not performed, the execution of the speculative access instruction is interrupted (aborted), and the speculative access instruction is sent back to the memory access queue. This prohibits executing the load instruction LOAD1 to be speculatively executed for the privileged memory region M0 described in FIG. 1 to thereby avoid making the security of the processor vulnerable.

However, even for the memory access instruction to be speculatively executed, when the memory access instruction is not for the specific address for which the speculative access is prohibited, the case in which the virtual address of the memory access instruction matches the virtual address of any of the entries in the L1TLB is determined as the TLB hit, as usual, and the case in which the virtual address of the memory access instruction does not match the virtual addresses of all the entry in the L1TLB do is determined as the TLB miss. In the case of the TLB hit, the cache determination for the L1 data cache memory is performed. In the case of the TLB miss, the TLB data are requested to the L2 cache, and the L1TLB is updated with the obtained TLB data.

Accordingly, among memory access instructions to be speculatively executed, speculative execution of an instruction that possibly makes processor security vulnerable is prohibited, and speculative execution of an instruction having no possibility to make the processor security vulnerable is permitted as usual. As a result, lowering processing efficiency of the processor achieved by the speculative execution may be suppressed to the minimum extent, and making the security vulnerable may be avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus, comprising:
   an instruction controller configured to issue an instruction;
   a first level cache including
      a translation lookaside buffer for storing part of a translation table entry in a memory,
      a first level data cache memory for storing part of data in the memory, and
      a first level cache controller configured to perform hit determination for the translation lookaside buffer in response to a memory access instruction issued by the instruction controller, and configured to perform cache control for the first level data cache memory when the hit determination for the translation lookaside buffer results in a hit; and
a second level cache including
a second level cache memory for storing part of data in the memory, and
a second level cache controller configured to control a data request in response to a data request issued by the first level cache controller, wherein
the instruction controller, when the memory access instruction is a memory access instruction to be speculatively executed that is executed while a branch destination of a branch instruction is undetermined, adds a valid speculation flag and an instruction identifier of the branch instruction to the memory access instruction and issues the memory access instruction to the first level cache, and
when in a first case in which in the hit determination for the translation lookaside buffer, a virtual address of the issued memory access instruction matches a virtual address of any of entries in the translation lookaside buffer is satisfied, and when in a second case in which the speculation flag of the issued memory access instruction is valid and an entry having a virtual address matching the virtual address of the memory access instruction stores a speculative access prohibition flag prohibiting speculative access is satisfied, the first level cache controller interrupts execution of the issued memory access instruction, and
when the first case is satisfied and the second case is not satisfied, the cache control is performed for the first level data cache memory by using a physical address read from the translation lookaside buffer.

2. The arithmetic processing apparatus according to claim 1, wherein
when in a third case in which in the hit determination for the translation lookaside buffer, the virtual address of the issued memory access instruction does not match virtual addresses of all entries in the translation lookaside buffer is satisfied, the first level cache controller issues a data request for requesting data of the translation lookaside buffer to the second level cache, and updates the translation lookaside buffer with the data of the translation lookaside buffer obtained by the data request.

3. The arithmetic processing apparatus according to claim 1, wherein
the instruction controller, when the memory access instruction is a memory access instruction to be non-speculatively executed that is executed after a branch destination of a branch instruction is determined, adds the speculation flag being invalid to the memory access instruction and issues the memory access instruction to the first level cache, and
the first level cache controller, when in the first case, determines that the second case is not satisfied, and performs the cache control for the first level data cache memory by using a physical address read from the translation lookaside buffer.

4. The arithmetic processing apparatus according to claim 1, wherein
the first level cache controller includes a memory access queue for storing a memory access instruction issued from the instruction controller,
the instruction controller, when a branch destination of the branch instruction is determined, sends a branch determination notification added with information indicating success/failure of branch prediction and an identifier of the branch instruction to the first level cache controller, and
in response to the branch determination notification, when the branch prediction succeeds, the first level cache controller invalidates the speculation flag of a memory access instruction stored in the memory access queue and having an identifier of a branch instruction matching the identifier of the branch instruction added to the branch determination notification, and when the branch prediction fails, the first level cache controller invalidates the memory access instruction stored in the memory access queue and having an identifier matching the identifier of the branch instruction added to the branch determination notification or an identifier of a subsequent branch instruction.

5. The arithmetic processing apparatus according to claim 4, wherein
the first level cache controller performs access control for the first level cache memory, for the memory access instruction issued from the memory access queue, and does not issue the memory access instruction from the memory access queue until the speculation flag is invalidated in response to the branch determination notification when the memory access instruction issued from the memory access queue satisfies the first case and further the second case, and the speculation flag is valid.

6. The arithmetic processing apparatus according to claim 4, wherein
the instruction controller includes an instruction decoder configured to decode an instruction, and a reservation station configured to issue the instruction issued from the instruction decoder to the first level cache controller,
the instruction decoder adds the speculation flag and the identifier of the branch instruction to the memory access instruction and issues the memory access instruction to the reservation station,
the reservation station includes a reservation station queue for storing the memory access instruction issued from the instruction decoder,
in response to the branch determination notification, when the branch prediction succeeds, the reservation station invalidates the speculation flag of a memory access instruction stored in the reservation station queue and having an identifier of a branch instruction matching the identifier of the branch instruction added to the branch determination notification, and when the branch prediction fails, the reservation station invalidates a memory access instruction stored in the reservation station queue and having an identifier matching the identifier of the branch instruction added to the branch determination notification or an identifier of a subsequent branch instruction.

7. A method of controlling an arithmetic processing apparatus comprising:
performing, by a first level cache controller, hit determination for an translation lookaside buffer in response to a memory access instruction issued by an instruction controller, and performing cache control for a first level data cache memory when the hit determination for the translation lookaside buffer results in a hit; and
performing, by a second level cache controller, a data request in response to a data request issued by the first level cache controller;

wherein the instruction controller, when the memory access instruction is a memory access instruction to be speculatively executed that is executed while a branch destination of a branch instruction is undetermined, adds a valid speculation flag and an instruction identifier of the branch instruction to the memory access instruction and issues the memory access instruction to the first level cache, and when in a first case in which in the hit determination for the translation lookaside buffer, a virtual address of the issued memory access instruction matches a virtual address of any of entries in the translation lookaside buffer is satisfied, and when in a second case in which the speculation flag of the issued memory access instruction is valid and an entry having a virtual address matching the virtual address of the memory access instruction stores a speculative access prohibition flag prohibiting speculative access is satisfied, the first level cache controller interrupts execution of the issued memory access instruction, and when the first case is satisfied and the second case is not satisfied, the cache control is performed for the first level data cache memory by using a physical address read from the translation lookaside buffer.

* * * * *